United States Patent
Yim et al.

(10) Patent No.: US 10,872,116 B1
(45) Date of Patent: Dec. 22, 2020

(54) SYSTEMS, DEVICES, AND METHODS FOR CONTEXTUALIZING MEDIA

(71) Applicant: Timecode Archive Corp., Daejeon (KR)

(72) Inventors: Ji Yim, Mountain View, CA (US); Baik Hoh, Campbell, CA (US)

(73) Assignee: TIMECODE ARCHIVE CORP., Daejeon (KR)

(*) Notice: Subject to any disclaimer, the term of this patent is extended or adjusted under 35 U.S.C. 154(b) by 0 days.

(21) Appl. No.: 16/581,584

(22) Filed: Sep. 24, 2019

(51) Int. Cl.
| | |
|---|---|
| *G06F 16/65* | (2019.01) |
| *G06F 16/638* | (2019.01) |
| *G06F 3/16* | (2006.01) |
| *G06F 16/61* | (2019.01) |
| *G06F 3/0484* | (2013.01) |
| *G06F 40/30* | (2020.01) |

(52) U.S. Cl.
CPC .......... *G06F 16/65* (2019.01); *G06F 3/0484* (2013.01); *G06F 3/165* (2013.01); *G06F 16/61* (2019.01); *G06F 16/639* (2019.01); *G06F 40/30* (2020.01)

(58) Field of Classification Search
CPC ........ G06F 16/65; G06F 16/639; G06F 16/61; G06F 3/165; G06F 3/0484; G06F 40/30
See application file for complete search history.

(56) References Cited

U.S. PATENT DOCUMENTS

| | | | |
|---|---|---|---|
| 5,454,102 A | 9/1995 | Tang et al. | |
| 2006/0112098 A1* | 5/2006 | Renshaw | G06K 9/6251 |
| 2006/0129400 A1* | 6/2006 | Fields | 704/260 |
| 2006/0242106 A1* | 10/2006 | Bank | H04L 67/02 |
| 2008/0222546 A1* | 9/2008 | Mudd | H04N 5/44543 |
| | | | 715/765 |
| 2009/0192998 A1 | 7/2009 | Paulsen | |
| 2009/0327230 A1 | 12/2009 | Levin et al. | |
| 2012/0158531 A1* | 6/2012 | Dion | H04N 21/439 |
| | | | 705/26.1 |
| 2012/0232683 A1* | 9/2012 | Master | G10L 25/51 |
| | | | 700/94 |
| 2013/0073632 A1 | 3/2013 | Fedorov et al. | |
| 2014/0280210 A1 | 9/2014 | Ritchie et al. | |
| 2019/0236207 A1* | 8/2019 | Lee | G06F 16/24578 |

OTHER PUBLICATIONS

The Semantic Web: Collective Intelligence on the Web written by Maciej Janik, 10.1007/s00287-011-0535-x © Springer-Verlag 2011, p. 469-483 (Year: 2011).*
Knowledge Extraction and Representation Learning for Music Recommendation and Classification written by Sergio Oramas Martín TESI Doctoral UPF / 2017. (Year: 2017).*

(Continued)

*Primary Examiner* — Hau H Hoang
(74) *Attorney, Agent, or Firm* — Cooley LLP

(57) ABSTRACT

Disclosed herein are systems, devices, and methods for contextualizing media. In some variations, a method of organizing audio may comprise generating first graph data nodes from structured text data comprising a predetermined audio data model and generating second graph data nodes from unstructured data. The first and second graph data nodes may be associated with the audio. The one or more first graph data nodes may be linked to the one or more corresponding second graph data nodes using a natural language processing model.

30 Claims, 15 Drawing Sheets

(56) References Cited

OTHER PUBLICATIONS

A semantic-based framework for building cross-domain networks: Application to item recommendation written by Ignacio Fernández Tobías Master thesis, Universidad Autónoma de Madrid, Sep. 2013 (Year: 2013).*

Find New Music Based on Music That You Like Already written by Amit Agarwal (https://www.labnol.org/about/) on Aug. 26, 2014 (Year: 2014).*

Vertigo lets friends listen to the same music in real time—TechCrunch written by Jordan Crook@jordanrcrook / 8:00 am MST • Jan. 19, 2017 (Year: 2017).*

MusicPedia: Retrieving and Merging-Interlinking Music Metadata Pipina T. Nikolaidou, Stavros N. Shaeles and Alexandros S. Karakos, Journal of Computing, vol. 3, Issue 8, Aug. 2011, ISSN 2151-9617 (Year: 2011).*

MusicLynx: Exploring Music Through Artist Similarity Graphs written by Alo Allik, WWW '18 Companion, Apr. 23-27, 2018, Lyon, France, © 2018 IW3C2 (Year: 2018).*

Structured vs. Unstructured data, Chirstine Taylor, Mar. 28, 2018,https://www.datamation.com/big-data/structured-vs-unstructured-data.html (Year: 2018).*

Batchelor et al. (2017). "Audio graphs." Retrieved on Dec. 24, 2019 (Dec. 24, 2019) from <https://docs.microsoft.com/en-us/windows/uwp/audio-video-camera/audio-graphs> entire document.

* cited by examiner

FIG. 10

SYSTEMS, DEVICES, AND METHODS FOR CONTEXTUALIZING MEDIA

TECHNICAL FIELD

Devices, systems, and methods herein relate to contextualizing media, including but not limited to audio.

BACKGROUND

The decline of physical media usage and advances in network technology have allowed streaming services to become an increasingly common and convenient way for users to consume music, movies, and other content. Some conventional music streaming services allow users to manually create a playlist of songs based on personal preferences and criteria. For example, a user may select a song based on their personal knowledge and interest in a particular album and artist. A user created playlist may be customized but is static in nature and therefore does not promote music discovery where a user is exposed to "new" music. Some music streaming services may automatically generate a playlist for a user based on predetermined criteria such as genre. Other playlists may be curated by trusted experts (e.g., music artist, disc jockey). However, the song selection rationale for these playlists is typically opaque and therefore limits music discovery and user engagement. As such, additional systems, devices, and methods for contextualizing media may be desirable.

SUMMARY

Described herein are systems, devices, and methods for contextualizing media including, but not limited to, audio. In some variations, a method of organizing audio may comprise generating first graph data nodes from structured text data comprising a predetermined audio data model and generating second graph data nodes from unstructured data. The first and second graph data nodes may be associated with the audio. The one or more first graph data nodes may be linked to the one or more corresponding second graph data nodes using a natural language processing model.

In some variations, the method may further comprise processing the second graph data nodes using the natural language processing model to determine one or more relationships between the first and second graph data nodes. Linking may be based on the one or more relationships. In some variations, the method may further comprise processing the second graph data nodes using the natural language processing model to generate a plurality of keywords. The plurality of keywords may be associated with a respective word vector. A similarity between the second graph data nodes may be calculated based on a similarity between each of the word vectors.

In some variations, the unstructured data may comprise image data (e.g., video, music video). In some variations, the method may further comprise computing similarity between the second graph data nodes, linking the second graph data nodes based on the similarity, and generating a narrative associated with the audio based at least on the similarity.

In some variations, a method of providing an audio program may comprise selecting one or more songs of the audio program, providing a narrative associated with one or more of the songs of the audio program, and sequentially accompanying one or more of the songs with the narrative spoken by a virtual host.

In some variations, the virtual host may comprise a set of configurable voice characteristics. In some variations, the virtual host may comprise a plurality of voices. In some variations, the narrative may comprise one or more of a response to user activity, music, news, traffic, weather, events, and advertisements. In some variations, the method may further comprise providing the narrative based at least on user activity and preferences. In some variations, the user activity may comprise one or more of user input to a conversation simulator, time, user geolocation, and online activity. In some variations, the narrative may comprise an image displayed on a user interface.

In some variations, the method may further comprise receiving the user activity using a conversation simulator on a computing device, and outputting one or more of the narrative and a suggested song using the conversation simulator in response to the user activity. In some of these variations, the conversation simulator may comprise a natural language processing and natural language generation model. In some variations, the method may further comprise providing a chatroom comprising a plurality of users simultaneously playing one or more of the songs and the narrative. In some variations, the method may further comprise generating graph data associated with the one or more songs based on the user activity of a plurality of users, and processing the graph data using a natural language processing model.

In some variations, the method may further comprise providing a graphical user interface for selection of one or more of the songs and the narrative to a playlist. In some variations, the method may further comprise generating a shared playlist for a plurality of users, the shared playlist comprising the narrative and the song. In some of these variations, the shared playlist may be based on one or more of proximity and online activity. In some variations, the method may further comprise generating the narrative using graph data, and updating the graph data based on crowd-sourced input.

In some variations, a method of recommending audio may comprise selecting a song using graph data based at least on user activity and user characteristics. The graph data may comprise structured text data nodes linked to unstructured text data nodes. A playlist may be generated comprising the selected song. In some variations, the method may further comprise displaying a graphical representation of a song selection rationale using the graph data.

In some variations, a method of displaying a graphical user interface for a virtual radio may comprise displaying a graphical representation of a media player and search interface on a display, processing user input to the search interface, and displaying a narrative associated with a song being played by the media player in response to the user input.

In some variations, the method may further comprise displaying a graphical representation of a chatroom for a plurality of users simultaneously playing the song. In some variations, the method may further comprise displaying a graphical representation of a playlist editor for selection of one or more songs and narratives. In some variations, the narrative may comprise a first narrative, and the method may further comprise displaying a graphical representation of a second narrative related to the first narrative. In some of these variations, the method may further comprise displaying a graphical representation of a suggested song based on the narrative.

BRIEF DESCRIPTION OF THE DRAWINGS

FIG. 10 is an illustrative variation of a graphical user interface relating to a conversation simulator.

DETAILED DESCRIPTION

Figure 1:
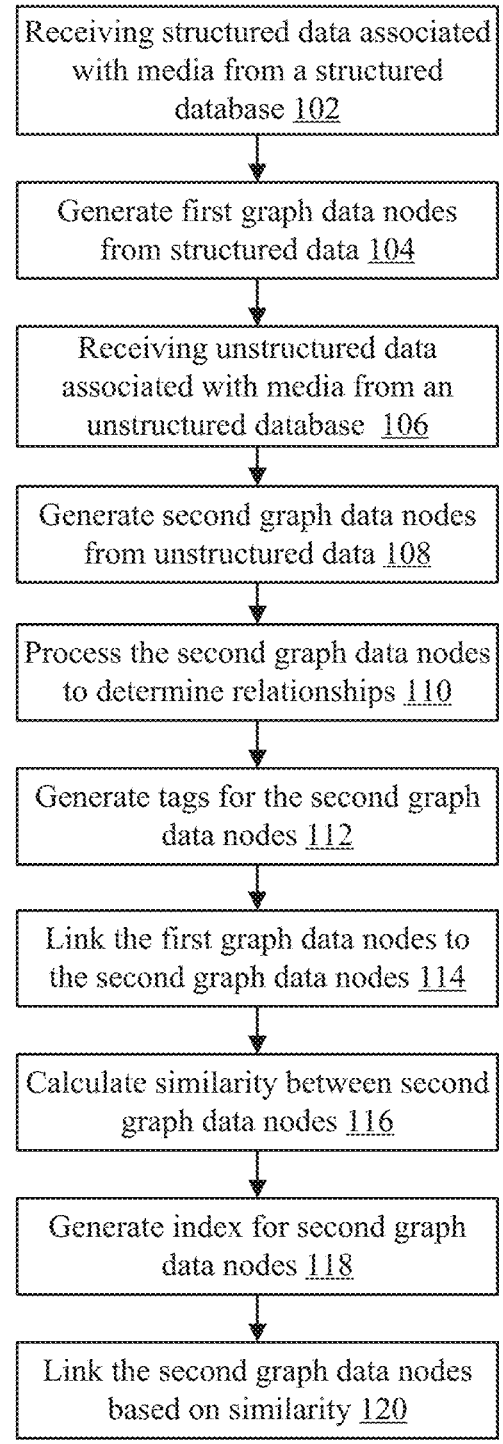
FIG. 1 is a flowchart of an illustrative variation of a method of organizing media.

Described herein are systems, devices, and methods for contextualizing media including, but not limited to, audio (e.g., music, songs). For example, music may be contextualized by accompanying a song with a narrative associated with the song where the narrative may add perspective and insight to the song. Providing context to a song through the narrative may deepen a user's relationship to the song. The narrative may pique a user's curiosity for additional narratives and related content. For example, learning an artist's intended meaning behind a song may increase a user's interest and emotional attachment to the song. In some variations, the user may desire to establish or deepen connections to other users by sharing the narrative and song to other like-minded users.

In some variations, the devices and systems described here may provide a narrative associated with media generated from graph data comprising structured and unstructured data. For example, unstructured data associated with media may be obtained from a plurality of sources (e.g., databases) that may provide a broad and deep set of graph data. In some variations the length and content of the narrative may be dynamically generated based on one or more parameter such as media metadata (e.g., tags), user input, activity, and preferences. The graph data may be updated periodically to allow generation of recent (e.g., current, up-to-date) narratives for a user. For example, a narrative describing a new album release and concert tour may be generated from graph data of unstructured data scraped from the most recent post on an artist's social media account announcing a new album and tour. A narrative (e.g., one or more sentences of text) may be generated from the graph data and accompanied with media to add context and enhance the user experience with the media.

In some variations, the narrative (e.g., story) may be spoken by a virtual host (e.g., avatar, virtual disc jockey, virtual TV broadcaster, multiple hosts) and accompany media (e.g., song, movie, TV show). In some variations, a user may listen to a personalized audio program (e.g., virtual radio show) where spoken narration adds context to the songs being played. For example, the narrative may serve as a segue between songs or spoken over a portion of the song. The narrative may, for example, describe the connection between the songs (e.g., same release year, same producer). In some variations, a narrative associated with the media may be displayed on a graphical user interface (e.g., displaying a music video associated with a song). For example, a computing device may be configured to output a song and display a corresponding narrative (e.g., text, video) associated with the song.

In some variations, a narrative and media may be provided based on user input to a chatbot such as a conversation simulator. User input may be processed using a natural language processing model. The user may input requests for a narrative, music discovery (e.g., music search functionality), and chat.

Some users may develop emotional attachments to specific media (e.g., favorite song, movie, actor, book, etc.) that may grow in view of a corresponding narrative as described herein. In some variations, users may connect in a peer-to-peer manner (e.g., chatroom) to express themselves based on the narrative or media. This may increase user engagement by allowing users to deepen a connection with others over a shared relationship to media.

In some variations, songs may be recommended using the graph data. For example, a song may be recommended for a user and a graphical representation of the rationale for the song recommendation may be displayed on a computing device. The rationale may be another form of narrative configured to promote acceptance of the recommendation and increase user retention.

These features, alone or in combination, may enhance a user's experience and relationship to the media they consume. Users may gain a deeper understanding and appreciation for media through narratives generated from a plurality of Internet sources, recommendations based on the graph data, and user connections formed around the media and associated narrative. Accordingly, the systems, devices, and methods for contextualizing media may improve media presentation, media discovery, user retention, and social engagement. This and other benefits of the devices and methods are described in more detail below herein.

I. Methods

Graph Data Generation

Described here are methods of contextualizing media using the systems and devices described herein. In some variations, a narrative associated with the media may be generated from graph data. The graph data may comprise a plurality of structured and unstructured data gathered from a plurality of sources. Graph data refers to a data structure comprising a plurality of nodes (e.g., vertices, points) connected by respective links (e.g., edges, lines). In some variations, a node may comprise an entity and a link may comprise at least a relationship between entities. Nodes may be characterized not only by relationships, but also by other properties (e.g., tags, attributes, metadata). A narrative may comprise one or more of the nodes and may be variable in length and content based on predetermined criteria such as media metadata, user input, user activity, and preferences.

Structured data may comprise data organized in a predetermined data model. In some variations, the predetermined data model may comprise a predetermined audio data model. For example, the predetermined audio data model may comprise data associated with audio (e.g., metadata) comprising artists (e.g., 2Pac), releases (e.g., "All Eyez on Me"), recordings (e.g., "California Love"), and the like. For example, a predetermined audio data model may comprise the MusicBrainz XML Metadata Format (MMD) representation of music metadata. The structured data under the predetermined audio model may be retrieved from a structured relational database in a set of tables having predetermined data fields.

By contrast, unstructured data may comprise data not organized according to the predetermined data model. For example, some unstructured data may be associated with the audio, but may not comply with the predetermined audio data model. For example, a website news article regarding the 2Pac hologram performance at Coachella may be associated with 2Pac's music, but the content of the news article may not comply with the syntax of the predetermined audio data model. That is, the news article is not structured data since it is organized under a data model (e.g., Hypertext Markup Language) different than the predetermined audio data model (e.g., MMD).

Media may refer generally to a form of communication (e.g., mode of expression) including, but not limited to, audio (e.g., music, radio, podcast, spoken word, audio book), video (e.g., movie, TV, image, art, virtual reality, video game, virtual world), text (e.g., publication, book, print, website), social media and networking (e.g., chat, live streaming, online community, forum, message board, text sharing, image sharing, video sharing), messaging (e.g., email, text), and performance (e.g., show, dance, theater, concert).

FIG. 1 is a flowchart that generally describes a variation of a method of organizing media. The method (100) may include receiving structured data associated with media (e.g., audio, video) from one or more structured databases (102). The structured data may be retrieved from one or more structured databases at predetermined intervals (e.g., hourly, daily, weekly, monthly, etc.). For example, new and/or updated structured data may be retrieved at predetermined intervals to acquire new release information. In some variations, the structured database may be an audio database such as MusicBrainz.

First graph data nodes may be generated from the structured data (104). Since the predetermined data model comprises a defined syntax, the structured data comprising the predetermined audio data model may be parsed in a predetermined manner into a graph data structure with predetermined nodes, links, and tags. For example, the structured data may be processed to determine one or more of an entity (e.g., subject, object, event), relationship (e.g., link, verb, predicate, sentence, attribute), and timecode (e.g., timestamp). For example, artist and album data fields of structured audio data may be processed to generate an artist node linked to an album node by a "composer" relationship. In some variations, the predetermined data model may comprise a predetermined audio data model such as MusicBrainz MMD.

Figure 2:
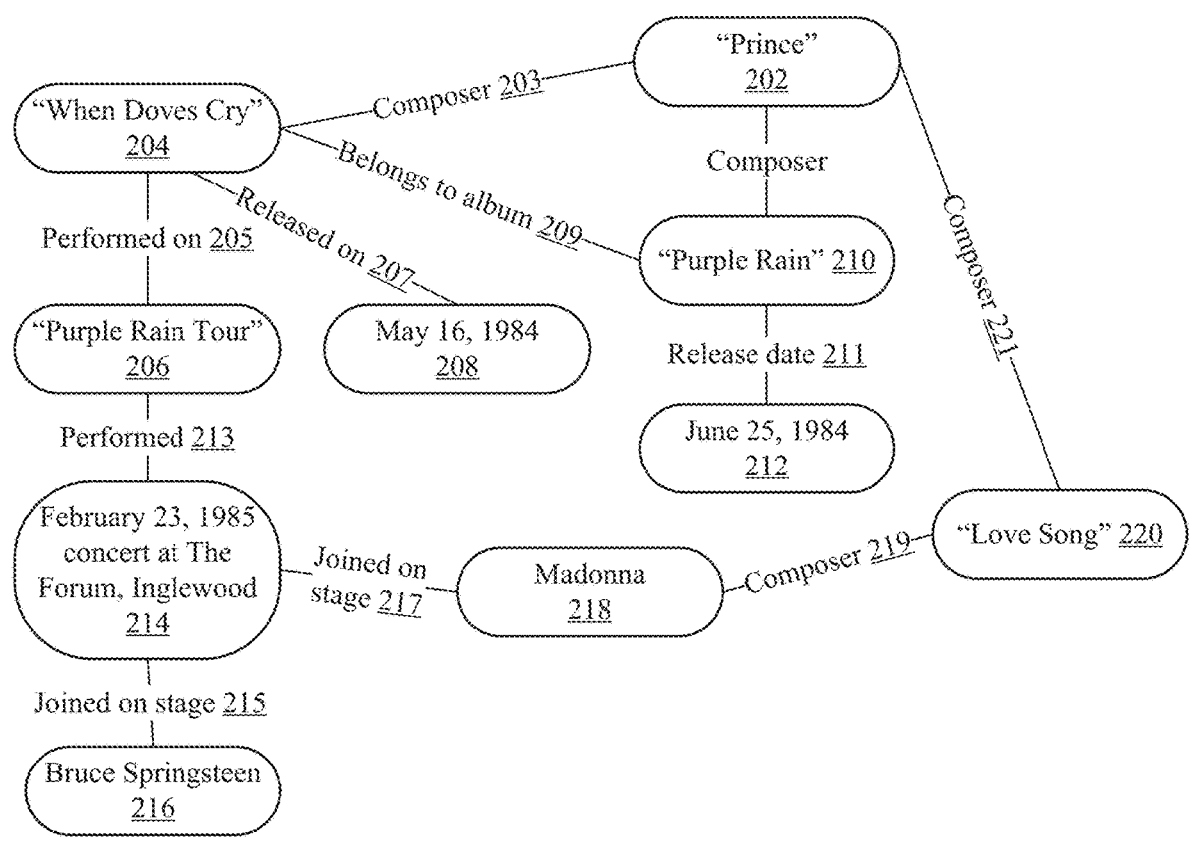
FIG. 2 is a schematic diagram of an illustrative variation of structured graph data.

FIG. 2 is a schematic diagram of a variation of structured graph data (200) generated from structured data comprising a predetermined audio model. The graph data (200) may comprise a set of nodes connected by links. For example, the graph data (200) generated from structured data of a predetermined audio data model may comprise an artist node (202), song node (204), concert node (206), release date node (208), album node (210), release date node (212), live performance node (214), artist node (216), artist node (218), and song node (220). The nodes may be linked based on their relationships to each other. For example, "Prince" composed the song "When Doves Cry" and is represented as node (202) linked (203) to node (204). "When Doves Cry" was performed on the "Purple Rain Tour" and is represented as node (204) linked (205) to node (206). "When Doves Cry" was released on May 16, 1984 and is represented as node (204) linked (207) to node (208). "When Doves Cry" belongs to the "Purple Rain" album and is represented as node (204) linked (209) to node (210). The "Purple Rain" album was released on Jun. 25, 1984 and is represented as node (210) linked (211) to node (212). The "Purple Rain Tour" included a performance at The Forum in Inglewood and is represented as node (206) linked (213) to node (214). Madonna and Bruce Springsteen both joined Prince on stage at that concert, which is represented as node (218) linked (217) to node (214) and node (216) linked (215) to node (214). Madonna and Prince further co-wrote "Love Song" as represented by node (220) being linked (221, 219) to respective nodes (202, 218).

In some variations, unstructured data associated with media (e.g., audio, video) may be received from one or more unstructured databases (106). The one or more unstructured databases may be retrieved (e.g., scraped) at predetermined intervals (e.g., hourly, daily, weekly, monthly, etc.). In some variations, one or more unstructured databases may comprise one or more of audio data, video data, text data, social media data, social networking data, and messaging data. For example, an unstructured database may comprise one or more of an open collaboration encyclopedia (e.g., wiki), digital library (e.g., Library of Congress), media popularity database (e.g., weekly sales and streams charts, box office chart, ratings chart), ticket sales and distribution database, media streaming database (e.g., music streaming service), social news aggregation website, discussion website, web content rating website, microblogging website, social media website, social network website, video-sharing site, streaming website, academic website, online forum, message board, lyrics site, artist website, fan website, news database (e.g., news website, news channel), weather database, traffic database, government database, business database, sports database, entertainment database, politics database, events database, web archive website, combinations thereof, and any scrapable database.

In some variations, second graph data nodes may be generated from unstructured data (108). For example, an artist page from an open collaboration encyclopedia may be processed to identify a set of characteristics used to generate the graph data. In some variations, a named entity scanner (e.g., named entity recognition) and coreferencer may be configured to process unstructured data (e.g., text web page of an open collaboration encyclopedia) and identify a set of entities. For example, the named entity scanner may identify all occurrences of "2Pac" and "Tupac" as entities. The coreferencer may be configured to identify one or more aliases that refer to the same "2Pac" entity, such as "Makaveli." In some variations, second graph data nodes may comprise non-text data such as audio data, video data, text data, social media data, social networking data, and messaging data each associated with media.

In some variations, the second graph data nodes may be processed to determine the relationships between the second graph data nodes (110). In some variations, the unstructured data may be processed using a natural language processing (NLP) model (e.g., AllenNLP). In some variations, the unstructured data (e.g., sentences, text in a web page) may be processed using an NLP model to identify one or more relationships (e.g., link, verb, predicate, sentence, attribute) and timecode (e.g., timestamp). The identified characteristics (e.g., entity, relationship, timecode) may be used to generate the links for second graph data nodes.

Figure 3:
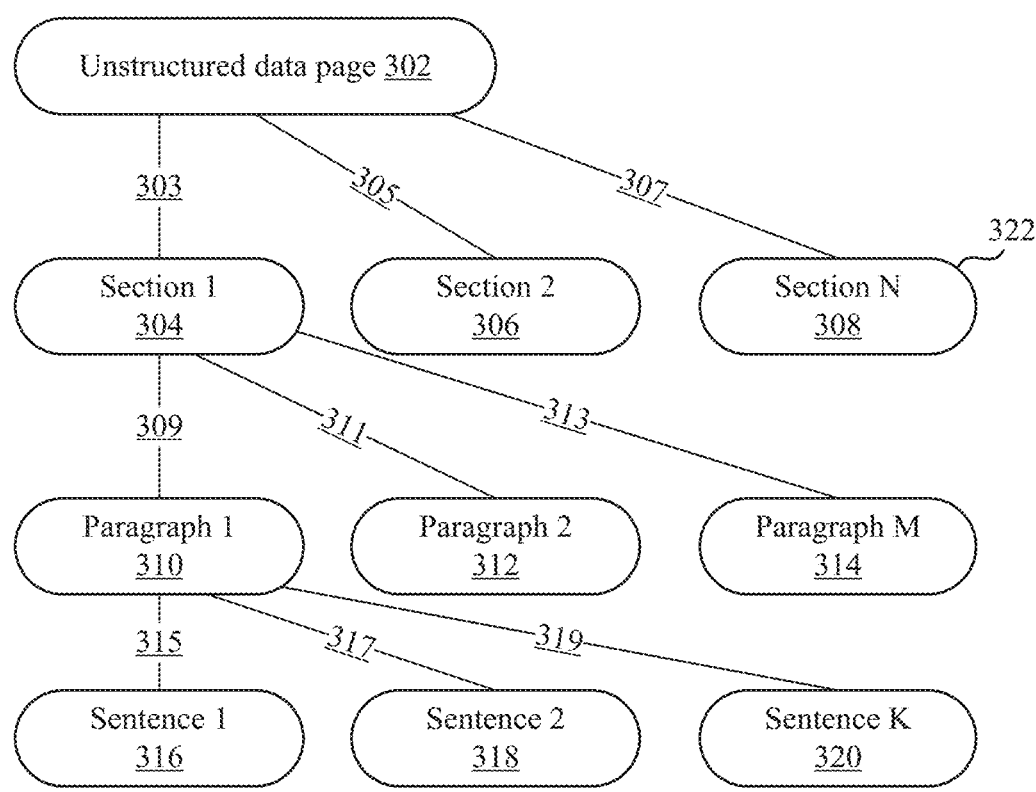
FIG. 3 is a schematic diagram of an illustrative variation of unstructured graph data.

In some variations, a second graph data node may comprise an entity such as a portion of text (e.g., phrase, sentence, paragraph). FIG. 3 is a schematic diagram of a variation of unstructured graph data (300) generated based on a webpage of an open collaboration encyclopedia. The webpage may be organized into sections, paragraphs, and sentences that may form the entity of respective nodes. For example, a Natural Language Processing model may be configured to process the unstructured webpage and parse the text into sections, paragraphs, and sentences as formatted on the webpage.

In some variations, the text of an entire unstructured data page may be a node (302). Predetermined portions of the data page (e.g., sections) may be stored in respective section nodes (304, 306, 308) connected by respective links (303, 305, 307). A section (304) may comprise a plurality of paragraphs (310, 312, 314) connected by respective links (309, 311, 313). Likewise, a paragraph (310) may comprise a plurality of sentences (316, 318, 320) connected by respective links (315, 317, 319). In some variations, tags (322) may be generated for each of the second graph data nodes (112) based on attributes (e.g., keywords) identified by the NLP model.

Figure 4:
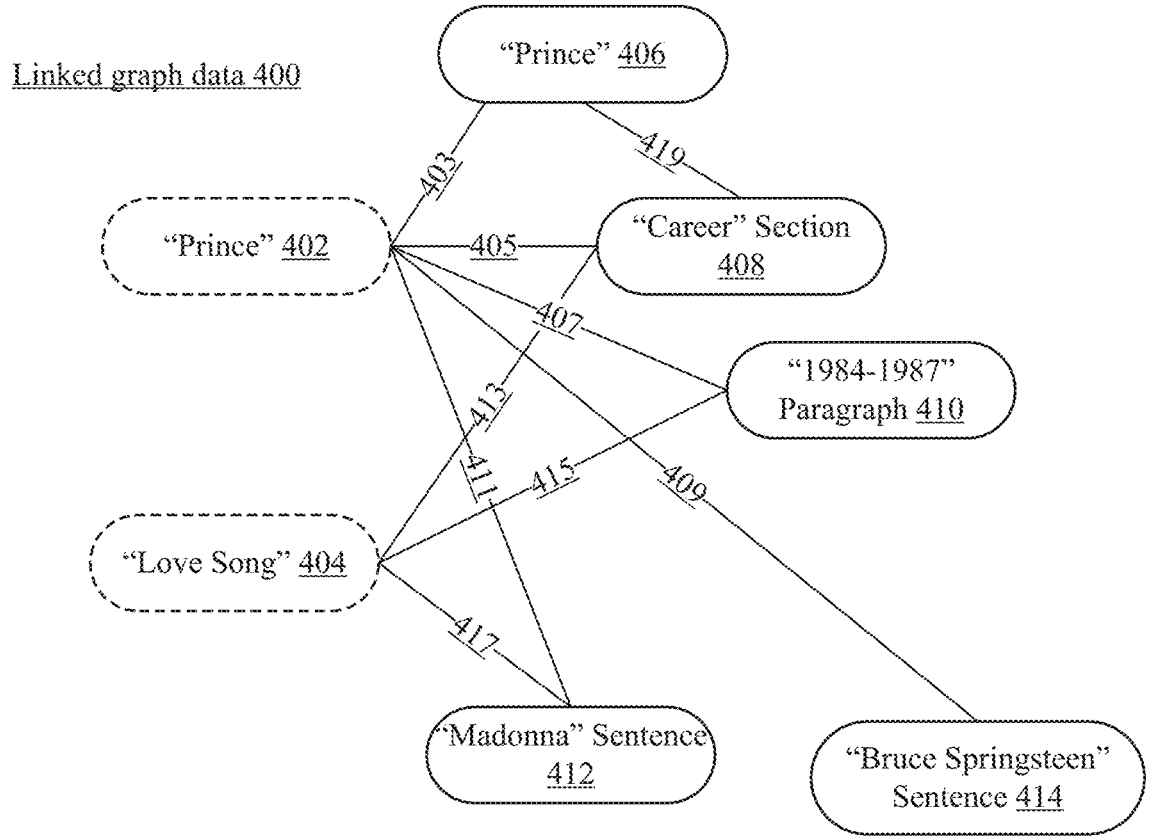
FIG. 4 is a schematic diagram of an illustrative variation of linked graph data.

In some variations, the first graph data nodes may be linked to the second graph data nodes (114). FIG. 4 is a schematic diagram of a variation of linked graph data (400). In some variations, linking second graph data nodes to the first graph data node (402) allows for search and retrieval of the unstructured data in the second graph data nodes via the structured data in the first graph data nodes. For example, a user input search for "Love Song" may begin at first graph data node (404) and return the set of second graph data nodes (408, 410, 412, 414) connected by links (413, 415, 417) to the first graph data node (404).

In some variations, graph data nodes may be linked based on shared characteristics. For example, first and second graph data nodes having the same data may be linked. FIG. 4 illustrates a first graph data node (402) for the artist "Prince" may be linked (403) to the second graph data node (406) for "Prince." Other second graph data nodes (408, 410, 412, 414) may be linked to the first graph data node (402) by respective links (405, 407, 409, 411) based on shared tags and entities.

In some variations, the narrative may be generated from one or more of the returned second set of graph data nodes (406, 408, 410, 412, 414). For example, a first narrative may comprise a single sentence (e.g., the data of second graph data node (412)) stating that Madonna co-wrote "Love Song" with Prince. A second narrative may comprise a paragraph (e.g., the data of second graph data node (410)) or a plurality of sentences (e.g., nodes (412) and (414)). For example, the second narrative may state that Prince and Madonna co-wrote "Love Song" and also performed on stage together at The Forum on the "Purple Rain Tour" with Bruce Springsteen. Some users may gain greater appreciation for a song and/or artist when they are aware of collaborations between artists.

As discussed herein, one or more of media metadata, narrative preferences, and user activity may be used to determine narrative parameters such as length and content. These narratives generated from structured and unstructured graph data may add context to music, thereby enhancing the user experience and promoting music discovery. For example, after listening to "Love Song" and the second narrative comprising graph data node (410), some users may request additional narratives (e.g., narratives about Madonna), perform music discovery (e.g., browse performances from the "Purple Rain Tour"), and engage in a commercial transaction (e.g., purchase Bruce Springsteen concert tickets). By contrast, conventional playlists do not contextualize media and promote user engagement.

In some variations, a similarity between second graph data nodes may be calculated (116). In some variations, the tags of a pair of graph data nodes may be compared to determine their similarity. For example, graph data nodes having the same tags (e.g., "rivalry", "artist", "pop") may have high similarity. Some tags may comprise different words having similar semantic meanings. In some variations, the similarity between tags may depend on a similarity between word vectors of the tags. A word vector may comprise a vector of weighted values corresponding to the meaning of a word. For example, a word vector may comprise a row of real valued numbers where each number captures a dimension of the word's meaning. Semantically similar words may have similar word vectors. For example, "rivalry" and "confrontation" may have similar word vectors. Similarity calculations using word vectors may be performed among entities in a graph data node, among entities in different graph data nodes, and among graph data nodes.

In some variations, a cosine similarity may be calculated between two word vectors that measures an angle formed by the two word vectors. The smaller the calculated angle, the more similar the two word vectors are to each other. For example, identical word vectors have a cosine similarity value of one while word vectors that are exactly opposite in N-dimensions have a cosine similarity of zero.

In some variations, an index for second graph data nodes may be generated (118). In some variations, the index may comprise the calculated similarity of each graph data node to every other graph data node. The index may be used to select a second graph data node having a predetermined similarity to another second graph data node. In this manner, a user may "like" a first narrative and then be provided a second narrative having high similarity to the first narrative. Additionally or alternatively, a similarity between graph data nodes may be calculated based on a link distance between graph data nodes.

Media and Narrative Presentation

In some variations, media and associated narrative(s) may be organized in a media program (e.g., show, broadcast) configured to add context to media and increase the interest, appreciation, and curiosity that the user has for the media. In some variations, an audio program may be provided where one or more songs are selected and a narrative associated with the song(s) may be provided. For example, the audio program may comprise a playlist of songs selected for the user. The narrative may be generated using a set of structured graph data and unstructured graph data. The narrative may accompany the song(s) with the narrative spoken by a virtual host (e.g., virtual disc jockey) to provide a user an audio program akin to a personal radio show. In some variations, the output of a song may be followed by the narrative spoken by an artificial voice. The narrative may also introduce a subsequent song. In this manner, the virtual host may be configured to contextualize songs being played through narratives (e.g., stories).

Figure 5:
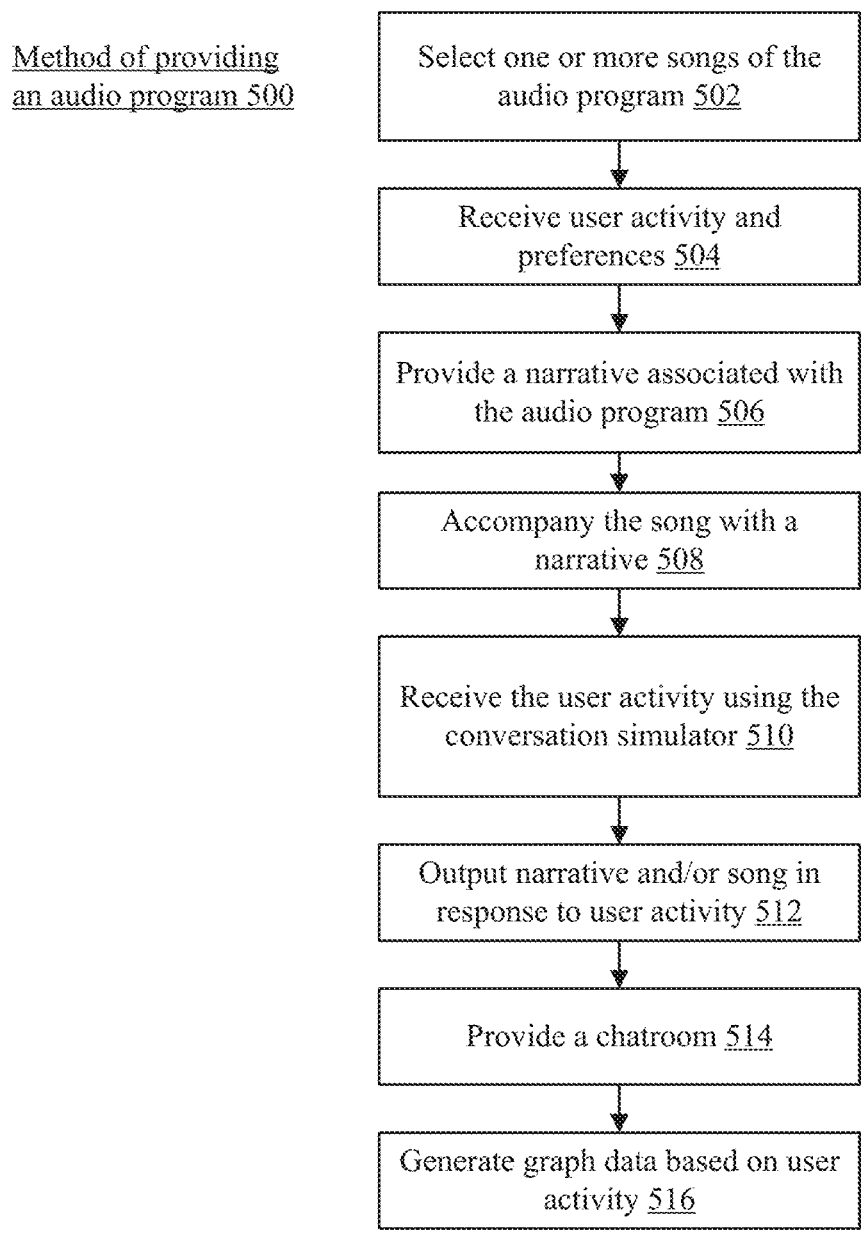
FIG. 5 is a flowchart of an illustrative variation of a method of generating a narrative.

FIG. 5 is a flowchart that generally describes a variation of a method of providing an audio program. The method (500) may include selecting one or more songs of the audio program (502). In some variations, the audio program may comprise a playlist of songs and narratives. For example, one or more pre-determined, genre-based audio programs (e.g., "Jazz", "80's", "Top 40") may be selected. In some variations, the user may select and/or edit one or more of the songs of the audio program using a graphical user interface. For example, a user may search for a specific artist and song in an input bar, and then may add one or more songs to a playlist (e.g., "My Playlist").

Figure 6:
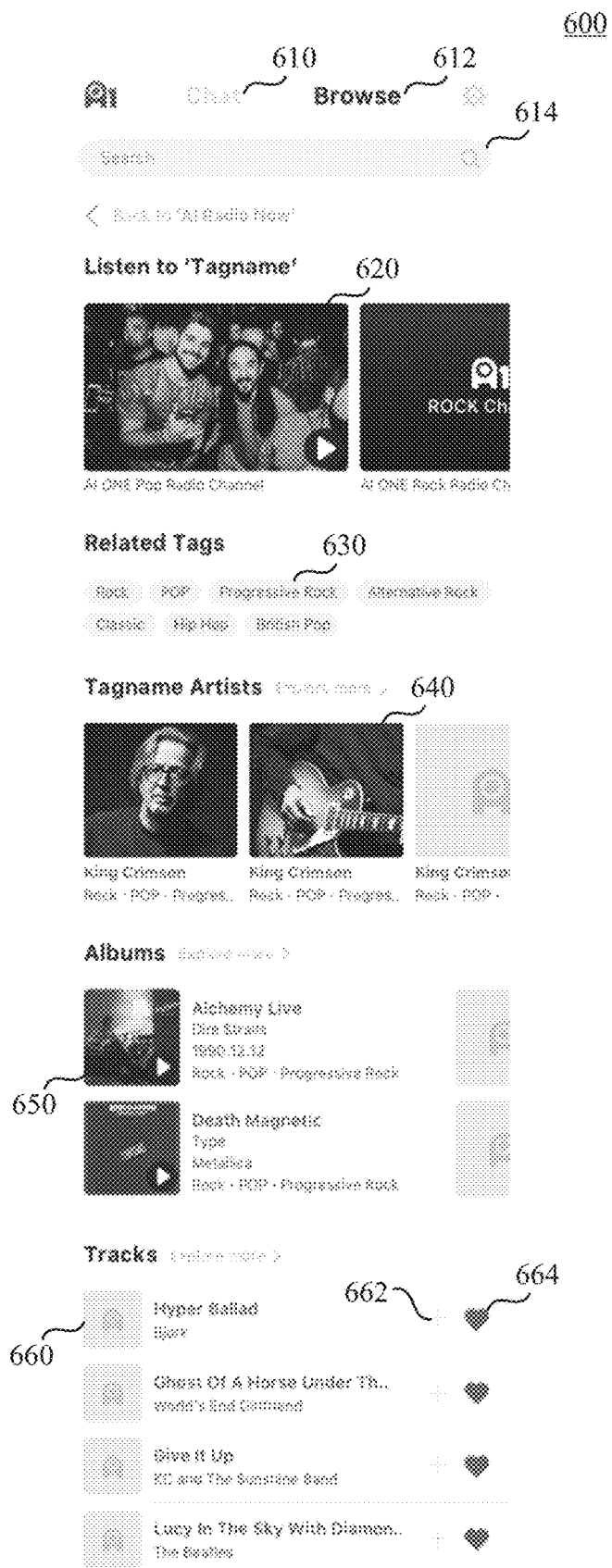
FIG. 6 is an illustrative variation of a graphical user interface relating to a media contextualization system.

In some variations, a graphical user interface (GUI) may be configured for song selection. FIG. 6 is a variation of a graphical user interface (GUI) (600) comprising a chat tab (610), browse tab (612), input bar (614), radio channel icon (620), tag (630), artist icon (640), album icon (650), song icon (660), selection icon (662), and favorite icon (664). FIG. 6 illustrates the interface associated with the browse tab (612) configured for search and music discovery. One or more of a playlist (e.g., radio channel), artist, album, and song may be searched and selected. Variations of a chat interface (e.g., see FIGS. 8-11) may be accessed by selecting the chat tab (610). A user input (e.g., text) may be entered in the input bar (614) (e.g., search bar). One or more icons may update and refresh in response to the user input.

A radio channel icon (620) may be configured to select a predetermined playlist. A plurality of tags (630) may be associated with one or more of the icons (620, 640, 650, 660) and may be configured for search and music discovery. For example, selection of the "Classical" tag may refer to a "Classical Radio Channel", classical artist (e.g., "Yuja Wang"), classical album, and classical tracks. Similarly, one or more of the artist icon (640), album icon (650), and song icon (660) may be configured for search and music discovery. For example, selection of song icon (660) may play the corresponding song or return a list of similar songs. In some variations, a song may be added to an audio program by selecting a corresponding selection icon (662). Selecting a favorite icon (664) of a song may add the song to a predetermined playlist (e.g., favorites playlist).

In some variations, a set of media parameters, user activity, and user preferences, as described herein, may be received (e.g., retrieved from memory) (504). In some variations, a narrative may be generated using graph data based on one or more media and user parameters. The media and user parameters may be used to determine one or more of the content, length, and style of the narrative. For example, the parameters may comprise one or more of data associated with the media, user activity, narrative preferences, external factors, social ranking, time, similarity, and the like. In some variations, the user activity may comprise one or more of user input to a conversation simulator, time, user geolocation, and online activity (e.g., application usage). In some variations, each parameter may comprise a predetermined priority and selection criteria. For example, one or more user preferences described herein may be set in a user settings graphical user interface. As described herein, a narrative based on the media and user parameters may be generated using a narrative generator.

In some variations, a narrative associated with one or more of the songs of the audio program may be provided (506). As described herein, a narrative associated with a song may be generated using a narrative generator and graph data based on one or more media and user parameters (e.g., user activity, user preferences) described herein. In some variations, the narrative may be generated from unstructured graph data linked to structured graph data. The narrative may comprise one or more of a response to user activity, music, news, traffic, weather, events, and advertisements.

Media Parameters

In some variations, a content of a narrative may be based on media parameters (e.g., data that describes the audio). For example, a narrative may be generated from graph data based on data associated with audio including one or more of a song title (e.g., "Lotus Flower"), artist (e.g., "Radiohead"), playlist (e.g., KCRW playlist), genre (e.g., "British rock"), and charts (e.g., "Billboard 200"). A narrative may be formed using a set of graph data nodes within a predetermined link distance from both a song graph data node (e.g., "Lotus Flower") and a playlist graph data node (e.g., KCRW playlist). For example, the narrative formed from the set of graph data nodes may describe the date "Lotus Flower" made its debut on the KCRW radio station.

In some variations, media parameters may be prioritized over other narrative generation parameters when a "new" song or artist is selected for playback. For example, a narrative associated with an artist may be generated the first time a song by that artist is selected for playback. This may promote music discovery by providing a timely narrative adding context for the user related to the new artist.

User Activity

In some variations, a narrative may be customized for a user by considering one or more of user activity, user parameters, and user inputs. In some variations, user activity may comprise one or more of user input, user history, and geolocation. In some variations, user input may be received using a graphical user interface (e.g., search bar, browse bar, chat bar). For example, a user input of "Best Weezer album" may be processed using an NLP model to generate a set of keywords used to search the graph data. A similarity calculation may be performed between the keywords and the graph data nodes. A predetermined number of graph data nodes having predetermined similarity may be selected to generate a narrative. Accordingly, in response to the user input and a search of the graph data for "Best Weezer Album," a narrative associated with the "Pinkerton" album may be provided and accompanied by playback of "El Scorcho." In some variations, user input may be prioritized over other narrative generation parameters.

In some variations, a narrative may be generated based on user activity comprising a user history including a playback history and search history. In some variations, user history may be prioritized over other narrative generation parameters based upon a predetermined playback/search frequency threshold. For example, a narrative associated with Beyoncé may be generated when a search history comprises over 10% "Destiny's Child" songs. Similarly, narratives associated with country music may be generated at a similar frequency to the rate country music is selected for playback by the user.

In some variations, a graphical user interface may be configured to allow a user to rate a narrative (e.g., like, favorite, thumbs down). The user rating of the narrative may be used as an input parameter in narrative generation. In some variations, user ratings may be prioritized over other narrative generation parameters based upon a predetermined ratings user threshold (e.g., 25% "like" frequency for Snoop Dogg associated narratives). For example, a user may "like" a narrative associated with a David Bowie song to prioritize additional narratives having a high similarity value to the David Bowie song. Conversely, a user may "dislike" a set of narratives associated with Nickelback to deprioritize additional graph data nodes having high similarity to Nickelback and/or "pop rock."

In some variations, narrative generation may be based on geolocation of a user. For example, user input of "Metallica" and a user geolocation of San Francisco may be used to generate a narrative corresponding to the Metallica and San Francisco Symphony "S&M" live album. In some variations, a geolocation may be used to determine a user's current activity. For example, a commuting status of the user may be determined based on a user geolocation (e.g., highway, train line) or a user speed (e.g., average speed over 15 miles per hour).

In some variations, geolocation may be prioritized as a narrative generation parameter over other narrative generation parameters when the user is commuting or travels a predetermined distance (e.g., travel to a different state or country). For example, a change in user geolocation from New York to Jamaica may prioritize narratives associated with Reggae music, and a change in user geolocation from land to water may generate narratives associated with "Yacht Rock." A narrative comprising local traffic and weather data may be generated when a user is commuting. In particular, a user commuting status may prioritize narratives comprising traffic graph data nodes and weather graph data nodes retrieved from graph data.

Narrative Preferences

In some variations, narrative generation may be based on a set of narrative preferences that allow a user to customize one or more characteristics of a narrative. In some variations, a narrative preference may comprise one or more of verbosity, content, frequency, complexity, tone, and data source. In some variations, verbosity may correspond to the length (e.g., wordiness) and speed of a spoken narrative. For example, the narrative may comprise one or more sentences. Narrative generation based on verbosity may allow a user to determine how much of a narrative is generated. In some variations, the set of narrative preferences may be predetermined and/or configured by a user.

In some variations, narrative generation may be based on predetermined set of content parameters (e.g., media metadata, tag) configured to rank a subject matter of a narrative. In some variations, content may comprise one or more of media, news, weather, traffic, stocks, business, entertainment, sports, social, technology, celebrity, politics, consumer, local, national, food, lifestyle, recreation, travel, real estate, legal, government, technology, video games, publications, combinations thereof, and the like. For example, a user may configure a content parameter to prioritize artist, food, and local politics narratives and exclude national politics and sports narratives. As another example, the content parameter may be configured to prioritize a tabloid narrative for pop music and a historical narrative for classical music. A narrative associated with a "Top 40" playlist of songs may prioritize entertainment graph data and national news graph data. A narrative associated with a band specific playlist (e.g., "Nirvana") may prioritize artist graph data (e.g., Kurt Cobain biography).

In some variations, narrative generation may be based on narrative frequency configured to set the rate at which narratives are generated for media (e.g., narrative for every song, narrative for every change in genre, narrative every 15 minutes).

In some variations, narrative generation may be based on text complexity of the second graph data nodes. In some variations, unstructured data may be processed by an NLP model to generate a text complexity tag associated with a readability metric (e.g., school grade level equivalents). That is, each second graph data node may comprise a tag indicating how simple or complex the text is. Text complexity may be based on one or more of vocabulary, sentence structure, cohesion, and the like.

In some variations, narrative generation may be based on a narrative sentiment (e.g., tone) of the second graph data nodes. This may allow a user to set a mood of the narratives to their own preference. In some variations, unstructured data may be processed by an NLP model to generate a sentiment tag associated with a tone (e.g., emotion, language, social). For example, an emotion tone tag may comprise one or more of anger, disgust, fear, joy, and sadness. A language tone may comprise one or more of analytical, confident, and tentative. A social tone may comprise one or more of openness, conscientiousness, extraversion, agreeableness, and emotional range.

In some variations, narrative generation may be configured to prioritize narratives of graph data nodes from a predetermined set of data sources. For example, a user may rank a narrative data source in order of an artist's social media account, music publication, entertainment website, and news website. Similarly, the user may exclude a predetermined set of data sources (e.g., forum, message board, rival artist website) and associated graph data nodes from narrative generation.

In some variations, narrative generation may be based on a set of external factors such as the weather, date, events, social ranking, and the like. In some variations, narrative generation may be based on local environmental conditions (e.g., weather, season). In some variations, narrative generation may be based on a set of predetermined weather conditions. For example, narratives associated with positive tags (e.g., joy) may be prioritized under sunny and warm conditions. In some variations, the narrative may be accompanied by songs associated with the weather. For example, the song "November Rain" may be recommended with an associated narrative under inclement weather conditions. Conversely, songs may be deprioritized based on the weather conditions. For example, the song "Let it Snow" may be excluded for selection and/or recommendation under hot and humid conditions.

In some variations, narrative generation may be based on one or more temporal characteristics. For example, narrative generation may be based on predetermined dates and periodic cycles (e.g., anniversary, birthday). For example, a narrative associated with Michael Jackson's "Thriller" album may be generated on the anniversary of its release. Similarly, a narrative associated with Jim Morrison may be generated on the anniversary of his death. In some variations, narrative generation may be based on a day of the week or time of day. For example, narratives associated with a song and a specific day of the week (e.g., "Friday, I'm in Love") may be generated only on that day. Narratives associated with a dance song may be prioritized for the weekend and the days leading up to the weekend. In some variations, narratives associated with local traffic may be generated during weekday commute hours and otherwise excluded from narrative generation. In some variations, a playlist of songs and/or set of narratives may be generated in a chronological order based on the graph data to provide a biographical-style playlist.

In some variations, a narrative associated with an event (e.g., up-coming concert, holiday, local event, release date) may be generated prior to or during the event. For example, a narrative associated with a Halloween song may be generated the week leading up to Halloween. A narrative associated with a local county fair may accompany a country song and may be prioritized throughout the duration of the county fair. Other examples may include a romantic narrative associated with media and generated on Valentine's day or a patriotic narrative associated with media and generated on July $4^{th}$. In some variations, a narrative associated with a song may be generated based on a predetermined milestone (e.g., Gold record status, Top 40 song ranking). In some variations, narrative generation may be based on user milestones. For example, a celebratory narrative associated with a song may be generated on a user's birthday.

In some variations, narrative generation may be based on social trends. In some variations, narrative generation may be based on a narrative and/or second graph data nodes having a predetermined social ranking (e.g., exceeding a predetermined number of likes, shares). For example, a viral social media post from an artist garnering over a predetermined number of shares may be prioritized for narrative generation for a song of that artist.

In some variations, a narrative spoken by a virtual host may accompany one or more of the songs of the audio program (508). The virtual host may be configurable, thereby allowing the audio program to be tailored to one or more of the song, narrative, and user preferences. In some variations, the virtual host may be configured to output speech that mimics human voice. In some variations, the virtual host may comprise a set of configurable voice characteristics. In particular, a virtual host may be represented by an output of a speech synthesizer (e.g., text-to-speech system) configured to generate speech comprising a set of configurable voice characteristics. The virtual host may identify itself as an artificial intelligence (AI) DJ.

In some variations, the virtual host may comprise one or more voice characteristics comprising verbosity, pitch, intonation, speed, regional accent, expressiveness, gender, age, and the like. Verbosity corresponds to a length of a narrative. In some variations, a regional accent of a virtual host may correspond to an accent of one or more songs in the audio program. For example, an audio program comprising New Orleans music may have a virtual host configured with a Cajun accent. In some variations, a speech speed of the virtual host may correspond to a speed of one or more songs in the audio program. For example, an audio program comprising electronic dance music may have virtual host configured with an energetic, fast-paced voice. In some variations, voice characteristics may be configured for different portions of a narrative. For example, a traffic report may be narrated using a flat, intelligible tone of voice; a tabloid segment may comprise a lighthearted and entertaining voice; and a narrative that precedes an R&B song may be narrated using a slow, deep voice.

In some variations, the voiced narrative may be interspersed at predetermined intervals with human-generated sounds and intentional mistakes to add realism and character to the virtual host. In some variations, human-generated sounds may comprise one or more of a sneeze, cough, burp, flatulence, joint cracking, grunt, exclamation, yell, scream, whisper, inhalation, exhalation, stomach gurgle, clap, combinations thereof, and the like.

In some variations, environmental sounds and intentional mistakes may be used to enhance a narrative and/or for effect, and may comprise one or more of a stutter, long pause, volume changes, microphone feedback, page turn, paper shuffling, static, combinations thereof, and the like. For example, a narrative associated with a Halloween song may use a stutter to add a sense of fear to the narrative. A narrative comprising a book excerpt may be enhanced by the addition of a page turn sound effect.

A user's connection to the media may deepen as the narrative adds context and a virtual host enhances and/or matches the context of the media. For example, the user may be reminded of a radio and/or VJ from the 80's when the virtual host mimics an 80's host personality. In some variations, the voice of the virtual host may be configured to represent a fictional, archetype, or historical character. In some variations, the voice of the virtual host may be configured to mimic a real person. For example, the voice of the virtual host may mimic a celebrity (e.g., actor), musician, personality (e.g., TV host), and the like. In some variations, the voice of the virtual host may be configured as a composite of a plurality of people (real or artificial). In some variations, a virtual host of a radio program associated with "oldies" from the 1950's may comprise a voice having a persona (e.g., radio accent) from that era (e.g., Ed Herlihy).

In some variations, the virtual host may comprise a graphical representation on a display. For example, an avatar may be displayed on a chatbot interface where the avatar and voice synthesizer may be configured to output the narrative. In some variations, the avatar may graphically represent a person (e.g., realistic human face) or a fictional character (e.g., cartoon, animal, alien).

In some variations, the voiced narrative may follow sequentially before or after a song. In some variations, each segment of an audio program (e.g., song, narrative) may be output to completion before the next segment is output. In some variations, the narrative may overlap one or more portions of at least one song. For example, the narrative and song may be mixed such that the song may function as background music while the narrative is spoken. In some variations, the narrative may be split into a plurality of portions interspersed between different songs. For example, a first half of a narrative may be spoken before a song is played, and a second half of the narrative may be spoken after the song is played.

In some variations, the voiced narrative may be skipped based on user input. A graphical user interface may be configured to accept input to skip or fast-forward through a narrative and/or song. The graphical user interface may comprise a thumbs down icon configured to negatively rate the narrative and/or end (e.g., skip) the narrative. In some variations, user input may comprise audio and haptic input. For example, a computing device may receive an audio command to "skip" or may detect a shake of the computing device to skip a narrative and/or song. In some variations, a narrative generated from predetermined data sources may be inhibited from being skipped. For example, a narrative (e.g., amber alert) generated from a predetermined governmental database (e.g., Emergency Alert System, Integrated Public Alert & Warning System) or an advertisement may be inhibited from being skipped by a user.

In some variations, the virtual host may comprise a plurality of voices. For example, each song in a program may have a different host, corresponding to a characteristic of the song (e.g., AI DJ's for each decade of music). In some variations, a plurality of virtual hosts may be provided with distinct voices to allow conversation between the virtual hosts.

Figure 7:
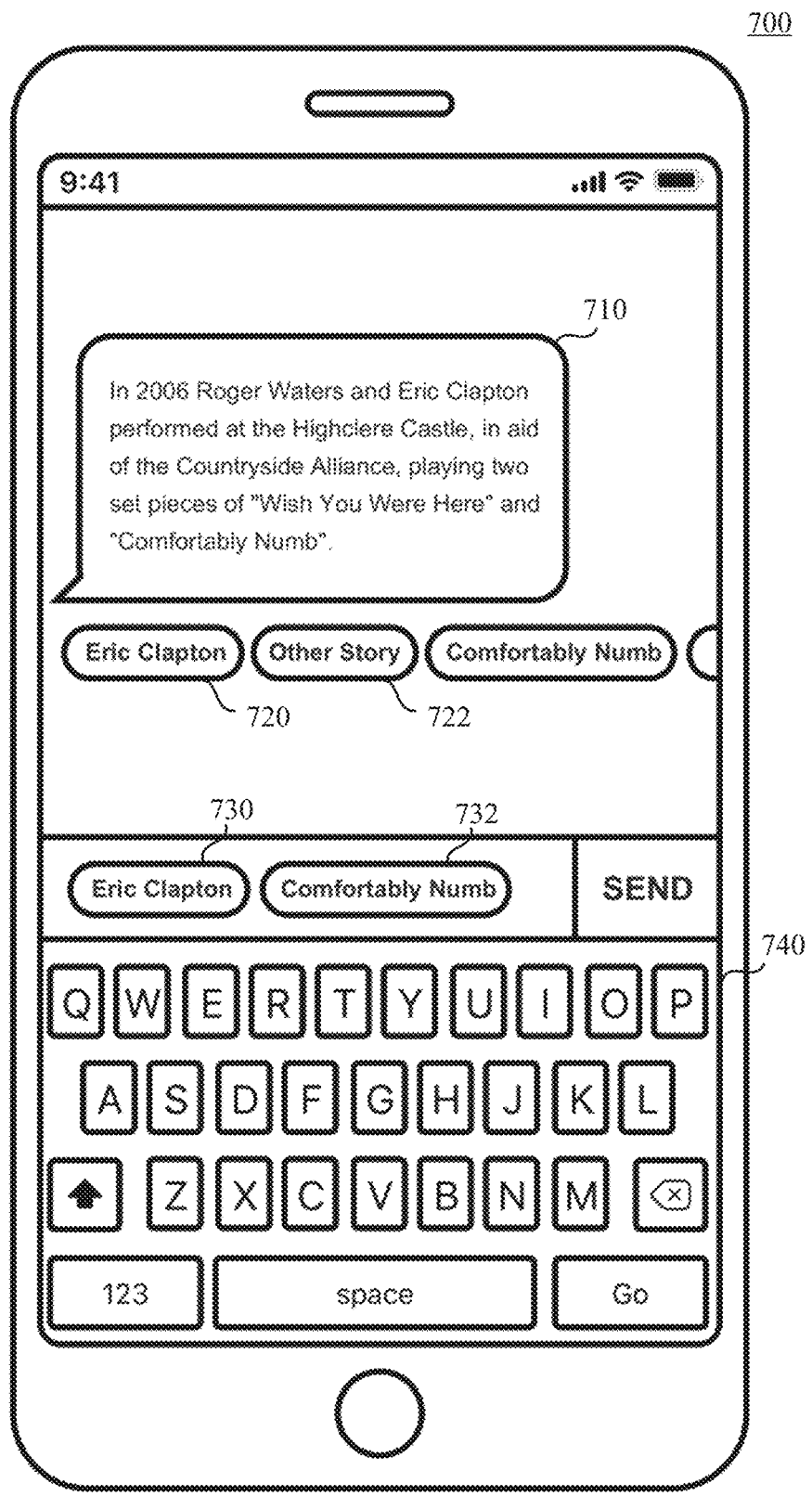
FIG. 7 is an illustrative variation of a graphical user interface displaying a narrative associated with a song.

In some variations, a visual narrative may accompany a song and allow a user to experience an audio program using multiple senses. FIG. 7 is a variation of a graphical user interface (GUI) (700) comprising a visual narrative (710), suggested narrative (720, 722, 730, 732), and user input interface (740). In some variations, the visual narrative (710) may be generated from a set of second graph data nodes. For example, the narrative (710) associated with the song, "Wish You Were Here" may be displayed on the GUI (700). Additional narratives may be generated and displayed in response to user input (740) or selection of a suggested narrative (720, 722, 730, 732). In some variations, the suggested narratives (720, 722, 730, 732) may be generated by a narrative generator using the graph data described herein. The suggested narratives (720, 722, 730, 732) may be associated with the narrative (710) based on one or more of a link distance, similarity, and tags. For example, a suggested narrative may comprise one or more tags (e.g., "Eric Clapton") of a second graph data node forming the narrative. In some variations, a plurality of suggested narratives (730, 732) may be selected at once. In some variations, a visual narrative may comprise one or more of text, images, and video. For example, a visual narrative may comprise image data such as a music video accompanying a song.

Conversation Simulator

In some variations, user activity may be received using a conversation simulator (e.g., chatbot) on a computing device (510). In some variations, the conversation simulator may comprise a natural language processing model and natural language generation model. In some variations, the user may input requests to the conversation simulator for music and narrative discovery (e.g., music search functionality), song recommendations, and chat. For example, a user may request one or more narratives associated with a currently playing song. In addition to narratives, the chatbot may recommend songs for a playlist. For example, the chatbot may recommend a new song referenced in a narrative. Moreover, the user may search (e.g., browse) for music through a chatbot interface.

Figure 8:
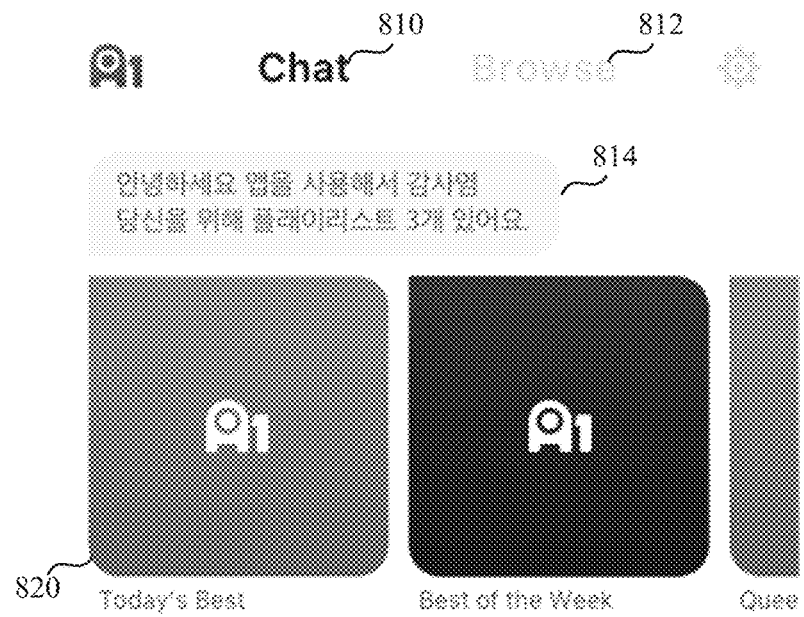
FIG. 8 is an illustrative variation of a graphical user interface relating to a conversation simulator.
Figure 8:
Figure 8:
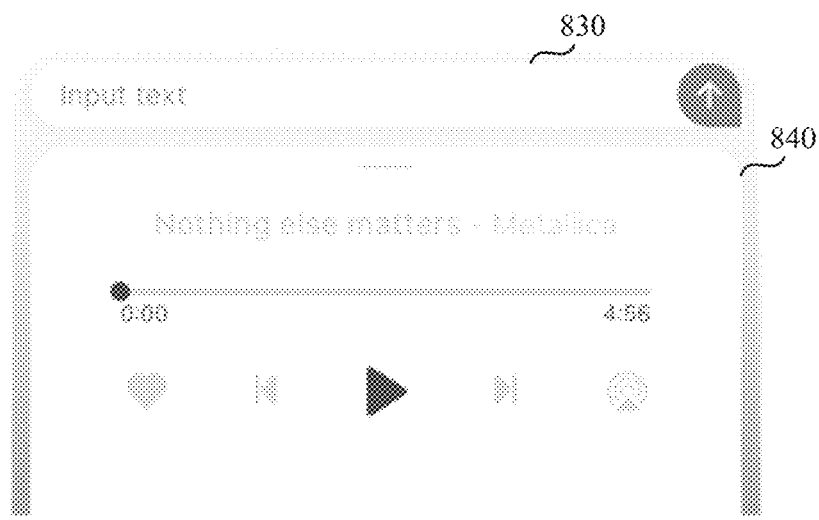

FIG. 8 is a variation of a graphical user interface (GUI) (800) related to a conversation simulator comprising a chat tab (810), browse tab (812), chatbot output (814, 816), radio channel icon (820), input bar (830), and media player (840). The GUI (800) allows a user to play music and a narrative, chat at least with a conversation simulator, and perform music discovery. In some variations, the chatbot output (814, 816) may comprise a narrative associated with a song being played by the media player (840). A radio channel icon (820) may be configured to select a predetermined playlist comprised of one or more songs and a narrative associated with the one or more songs. A user input (e.g., text) may be entered in the input bar (830) (e.g., search bar). The media player (850) may comprise a set of media controls such as play, last track, next track, and the like.

Figure 9:
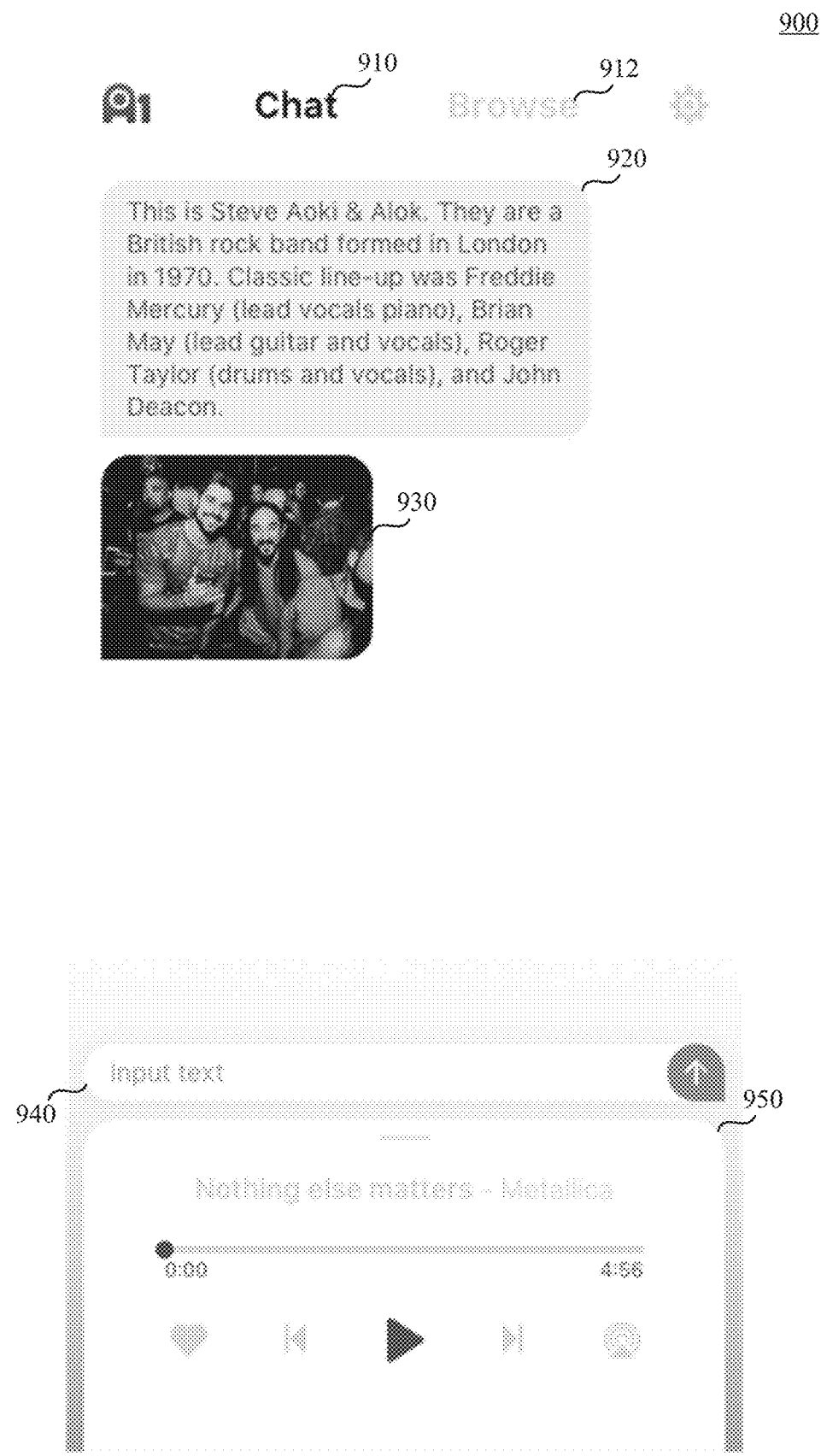
FIG. 9 is an illustrative variation of a graphical user interface relating to a conversation simulator.

FIG. 9 is a variation of a graphical user interface (GUI) (900) related to a conversation simulator comprising a chat tab (910), browse tab (912), chatbot output (920, 930), input bar (940), and media player (950). The GUI (900) allows a user to play music and at least one narrative, and interact with a conversation simulator. In some variations, the chatbot output (920, 930) may comprise one or more of a text narrative (920) and image narrative (930) associated with a song. The narratives (920, 930) may be generated from a set of unstructured graph data nodes. Each of the narratives may be associated with the tags "Steve Aoki" and "Alok." A user input (e.g., text) may be entered in the input bar (940) (e.g., search bar). The media player (950) may comprise a set of media controls such as play, last track, next track, and the like.

In some variations, a narrative and media may be provided based on user input to a chatbot such as a conversation simulator. One or more of the narrative and a suggested song may be output using the conversation simulator in response to the user activity (512).

Figure 10:
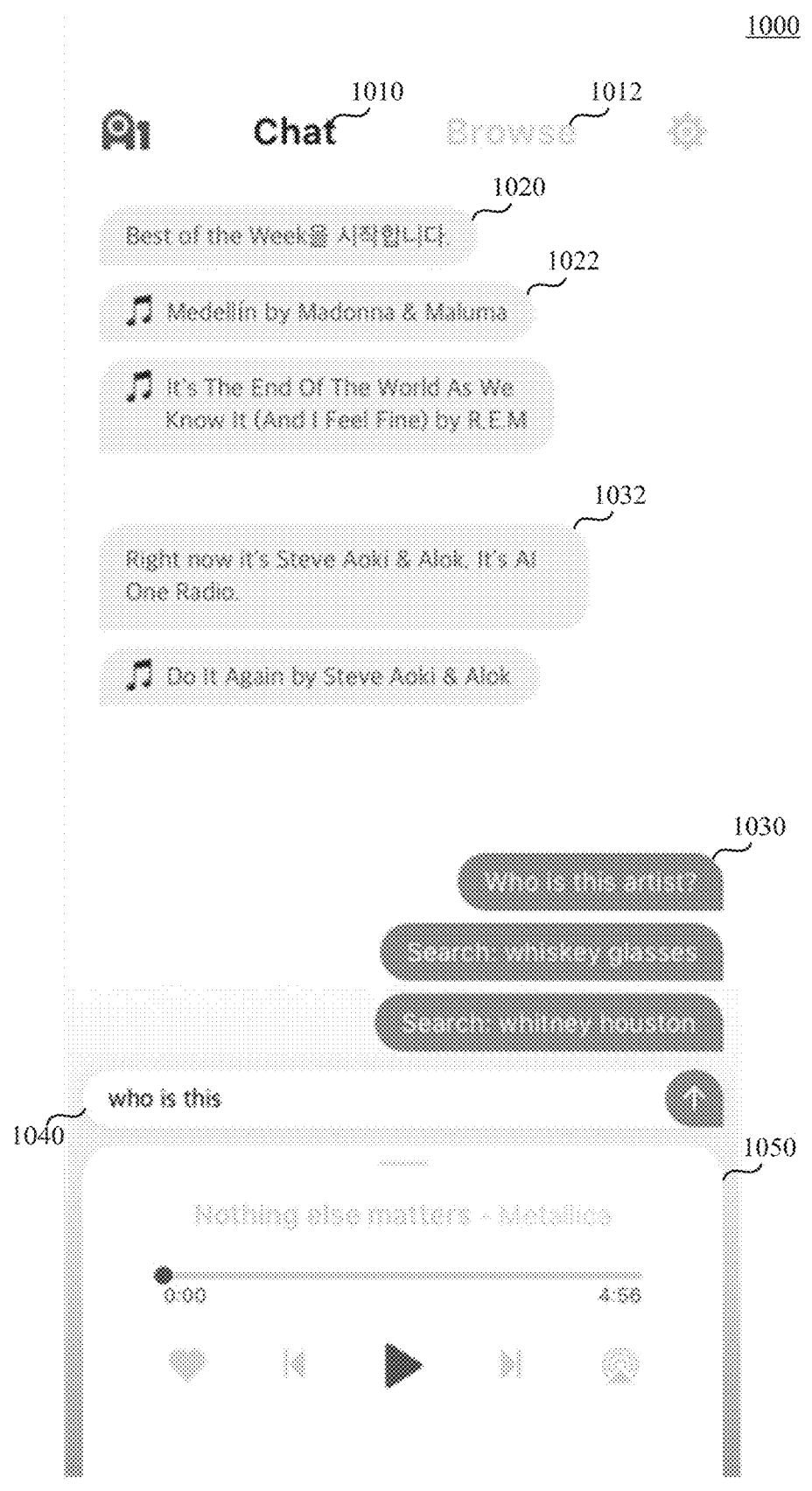

FIG. 10 is a variation of a graphical user interface (GUI) (1000) related to a conversation simulator comprising a chat tab (1010), browse tab (1012), chatbot output (1020, 1022, 1032), user input (1030), input bar (1040), and media player (1050). The GUI (1000) allows a user to play music and at least one narrative, and interact with the virtual host through a conversation simulator. In some variations, the chatbot output (1020, 1032) may comprise a text narrative associated with a song. For example, the output may comprise the name of the song and artist being played at that time. The narratives (1020, 1022, 1032) may be generated from a set of unstructured graph data nodes. The narrative may be provided automatically without user input. A user input (1030) may be entered in the input bar (1040) (e.g., search bar). In response to the user input (1030) of "Who is this artist?", the conversation simulator may process the user input (1030) using an NLP model and may generate and display output (1032). The user may input additional queries to generate corresponding narratives using the graph data. The media player (1050) may comprise a set of media controls such as play, last track, next track, and the like.

Figure 11:
FIG. 11 is an illustrative variation of a graphical user interface relating to a conversation simulator.

FIG. 11 is a variation of a graphical user interface (GUI) (1100) related to a conversation simulator comprising a chat tab (1110), browse tab (1112), chatbot output (1120, 1150, 1152), user input (1130), and action icon (1140, 1160, 1170, 1180). The GUI (1100) allows a user to play music and at least one narrative, and interact with the virtual host through a conversation simulator. In some variations, the chatbot output (1120, 1150, 1152) may comprise a text narrative (1120, 1150) and an image narrative (1152) associated with a song. The narratives (1120, 1152) may be generated from a set of unstructured graph data nodes.

In response to the user input (1130) of "Tell me about this song", the conversation simulator may process the user input (1130) using an NLP model and may generate and display one or more action icons (1140). For example, each icon may correspond to a command to display, respectively, lyrics, album information, and artist information generated from graph data. Action item (1170) corresponds to a suggestion to add a song to a favorites playlist, and action item (1180) corresponds to a suggestion to play one more Freddie Mercury song. The user may input additional queries to generate corresponding narratives using the graph data.

Figure 12A:
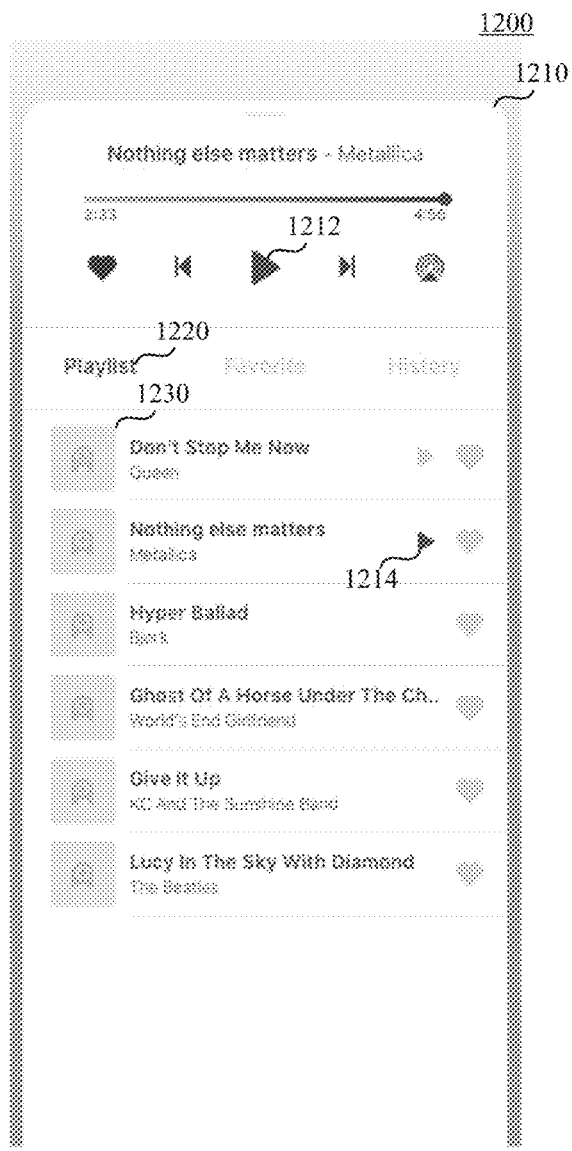
FIGS. 12A and 12B is an illustrative variation of a graphical user interface relating to a media player.
Figure 12B:
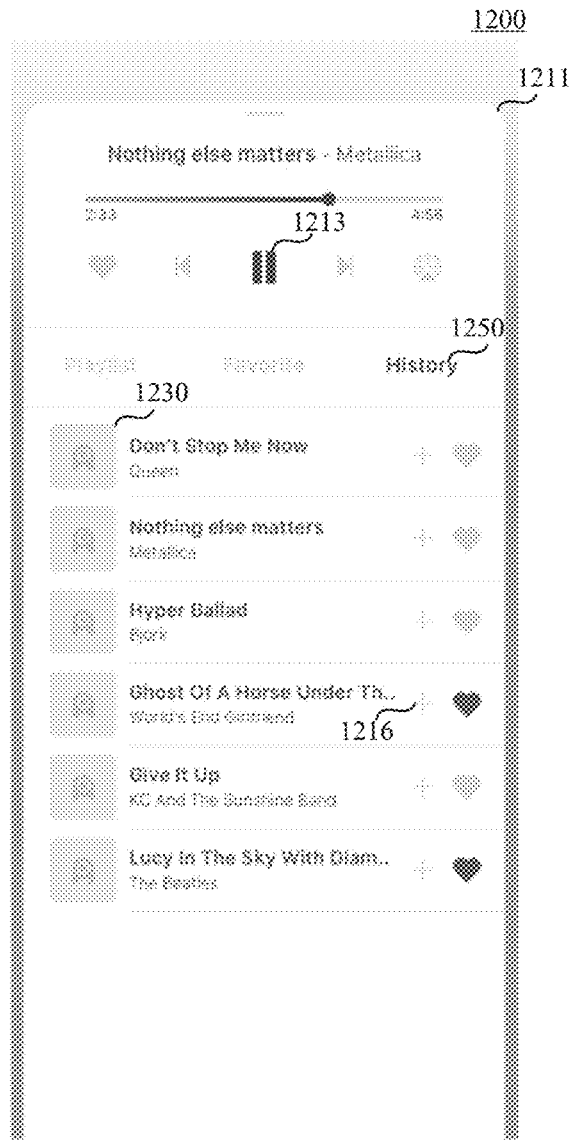

FIGS. 12A and 12B is a variation of a graphical user interface (GUI) (1200) related to a media player (1210). The media player (1210) may comprise a set of media controls (1212, 1214). As shown in FIG. 12A, a playlist tab (1220) is selected and shows a corresponding list of songs in the playlist with each song comprising a song icon (1230). As shown in FIG. 12B, a history tab (1250) is selected and shows a corresponding list of previously played songs. Selecting a favorite icon (1216) of a song may add the song to a predetermined playlist (e.g., favorites playlist).

Additional narratives and/or media may be provided based on user input to a chatbot such as a conversation simulator. In some variations, one or more of the narrative and a recommended song may be output using the conversation simulator in response to the user activity (512).

Social

In some variations, users may deepen connections to each other by engaging socially with one or more other users based on a narrative and associated media. In some variations, a chatroom may be provided to a plurality of users based on a shared experience with one or more of a narrative and media. For example, a plurality of users provided the same narrative and/or playing the same song at the same time may join a chatroom together. The users may join the chatroom anonymously without registration or a profile.

Users in the chatroom may share one or more of media, received narratives, songs, playlists, and text input.

The chatroom allows group participation and an outlet for expression, and may increase user engagement by allowing users to deepen a connection with one or more of the narrative, song, and other users. In some variations, user input in a chatbot interface and/or chatroom may be processed and stored in the graph database as unstructured graph data nodes. In some variations, chat conversations in the chatroom between a plurality of users may be processed by an NLP model and stored in the graph database and linked to other unstructured graph data nodes. These unstructured graph data nodes may be used to generate social narratives. In some variations, these social narratives may comprise a timecode associated with media.

For example, user chat input of "I love this guitar solo!" during playback of a song may be stored as an unstructured graph data node (e.g., social narrative) linked to a song. The node may further comprise a chat input timecode (e.g., timestamp) with respect to the song. In some variations, when other users listen to the song, the user chat input may be output at the corresponding timecode so the other users can receive the social narrative at the same point in the song. Accordingly, the methods described may provide an asynchronous communal experience with media, thereby promoting user engagement.

In some variations, a virtual host may select a social narrative generated by a user for a media program (e.g., audio program, virtual radio channel). For example, the virtual host may introduce a song by narrating a corresponding social narrative of, "This song rocked Glastonbury!"

In some variations, a social narrative may comprise quotes by one artist about another artist. For example, an interview from a publication may comprise a discussion of an artist's musical influences (e.g., Jazz musician's praise of Miles Davis), which may be parsed and stored as a social narrative associated with Miles Davis. In some variations, unstructured data may be processed by an NLP model to generate a set of social narratives. These social narratives may be provided in media programs to promote music discovery.

In some variations, users may engage socially with others to share a narrative, media, and playlist based on physical proximity (e.g., shared geolocation). This may allow users to share media and narratives while physically together. In some variations, media and narrative control may be shared by a plurality of users when the users are within a predetermined distance from each other (e.g., same building, same bus). In some variations, a user may receive a request to share playlists and media control based on proximity. For example, a computing device of each user on a bus may share the same playlist where each user may view and make modifications to the media and narratives in the playlist while on the bus. The media may be output from one or more of the computing devices.

Error Correction

In some variations, narratives and graph data nodes may be updated (e.g., edited, corrected) by one or more users (e.g., crowd-sourced input) to improve the accuracy and quality of the generated narratives. In some variations, narratives may be flagged by a user for review based on content (e.g., grammatical error, suspected inaccuracy, outdated information, relevance). The flagged narratives may be reviewed and modified by a predetermined set of users (e.g., moderators, artist representatives, trusted fans). For example, an artist record label may update outdated album sales statistics.

Media Recommendation

Figure 13:
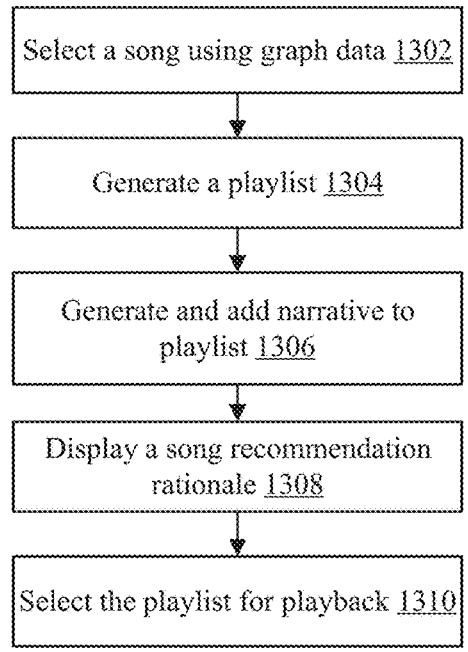
FIG. 13 is a flowchart of an illustrative variation of a method of displaying a user interface.

FIG. 13 is a flowchart that generally describes a variation of a method of recommending a song (1300). The method (1300) may include selecting a song using graph data based at least on user activity and user characteristics (1302). For example, graph data may be searched starting from a graph data node of a currently playing song or narrative. A set of song graph data nodes having a predetermined link distance or similarity to the current song graph data node may be returned and may be selected based on other user parameters (e.g., user playback/search history, weather, day, geolocation, etc.). In some variations, a playlist may be generated based on the selected songs (1304). In some variations, a narrative associated with the recommended song may be generated and added to a playlist (1306).

Figure 16:
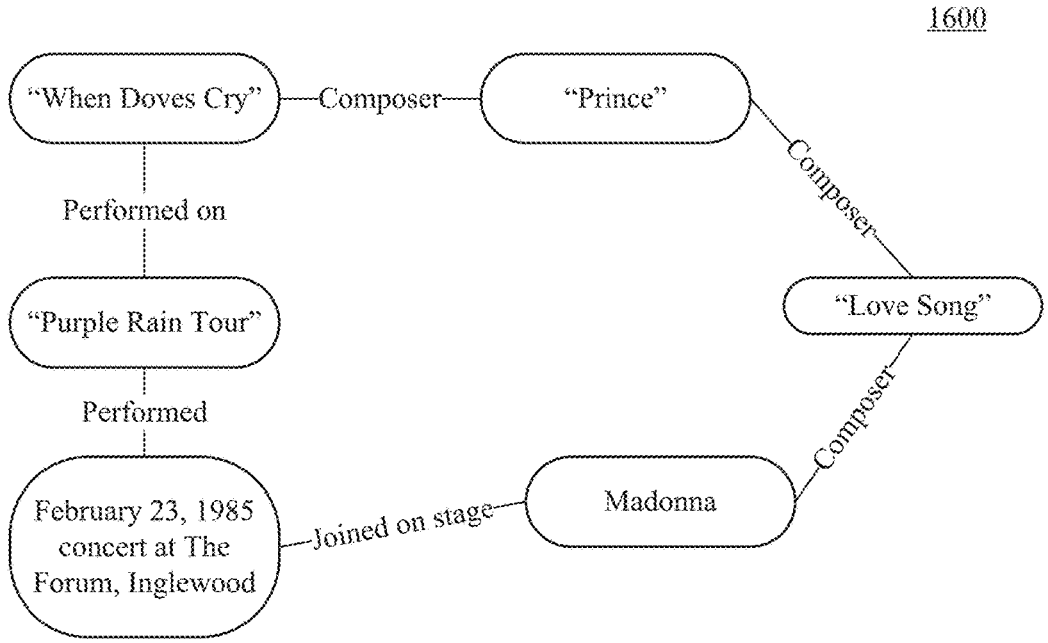
FIG. 16 is a schematic diagram of an illustrative variation of song recommendation rationale.

In some variations, a song recommendation rationale may be displayed (1308). The playlist may be selected for playback (1310). The rationale may add context and perspective to the user of the connection between songs and may thus promote user engagement. In some variations, a song recommendation rationale may be provided to a user and may be a graphical representation of the set of graph data nodes and links used to generate the song recommendation. FIG. 16 is a graphical representation of a song recommendation rationale (1600) displayed on a graphical user interface. For example, Prince and Madonna's "Love Song" may be recommended based on the last played song being "When Doves Cry", a predetermined link distance between nodes, and a high user rating for Prince and Madonna songs. In some variations, the rationale may be displayed on a graphical user interface to guide song selection, and be displayed during playback of the recommended song. In some variations, the rationale may be saved for later review. Likewise, in some variations, a narrative rationale may be provided to a user and may be a graphical representation of the set of graph data nodes and links used to generate the narrative. The narrative rationale may explicitly set forth the connection between the media and narrative and may promote user engagement.

In some variations, a playlist of songs may be generated and recommended based on a ranked list in unstructured data. For example, unstructured data may comprise a list of top songs (e.g., "100 Greatest Songs of All Time", "Top 20 Albums of the '90's", Billboard 200 chart) that may be used to generate corresponding playlists.

Advertisements

In some variations, a narrative associated with media may comprise an advertisement. For example, an advertisement associated with a song may promote an upcoming concert, festival, show, artist merchandise (e.g., T-shirts), retail copy of an artist album including the song, etc. In some variations, an advertisement narrative may be generated using graph data comprising unstructured data retrieved from an advertisement database. In some variations, a narrative associated with a song may integrate an advertisement. For example, a narrative may be generated from a news article that describes a band's favorite model and brand of guitars. This narrative may be configured as an advertisement narrative for a guitar company and prioritized for generation at a predetermined interval. However, the user provided the narrative may not realize that the narrative is intended as an advertisement. In some variations, the advertisement may not be associated with any particular media and may be associated with any set of products, services, and goods. In some variations, the advertisement narrative may comprise audio and/or video data. In some variations, a media program may comprise predetermined slots for advertisement narratives where one or more portions of the program may be sponsored.

In some variations, users may be inhibited from skipping advertisement narratives. In some variations, an advertisement preference may be configured to set a length, frequency, and type of advertisements provided to the user. In some variations, a content of the advertisement may be based on parameters such as user input, user history, and search history. An advertisement narrative may be based on a predetermined playback/search frequency threshold. For example, a playback/search history comprising a predetermined percentage of "Willie Nelson" and "Wiz Khalifa" songs may prioritize an advertisement narrative comprising cannabidiol (CBD) oil products over other advertisement narratives.

Graphical User Interface

Figure 14:
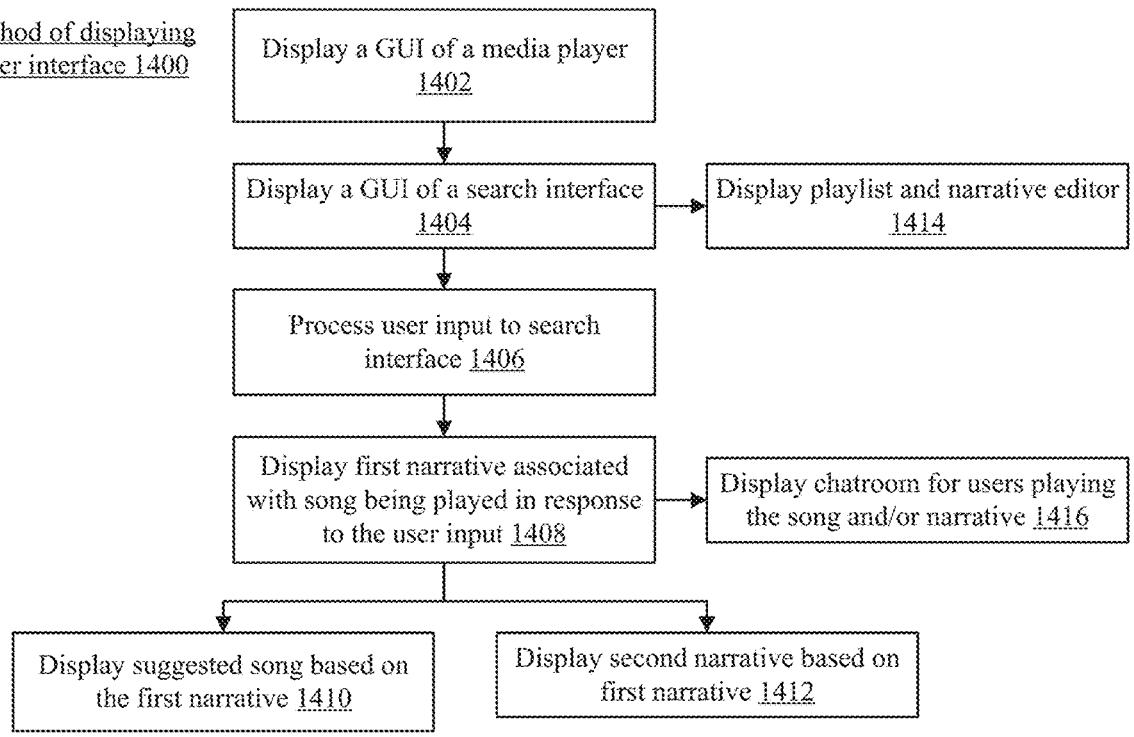
FIG. 14 is a flowchart of an illustrative variation of a method of recommending a song.

FIG. 14 is a flowchart that generally describes a variation of a method of displaying a user interface (1400). The method (1400) may include displaying a GUI of a media player on a display of a computing device (1402) and displaying a GUI of a search interface (1404). The GUI may comprise one or more of a chatbot interface, search interface, and media player, as shown in FIGS. 8-11. The GUI may receive and process user input to a search interface (1406). In response to the user input, a first narrative associated with a song being played may be displayed (1408). For example, the first narrative may be displayed and/or narrated using the chatbot interface. In some variations, a suggested song may be generated and displayed based on the first narrative (1410). For example, a graph data node of the suggested song may have a predetermined link distance to the graph data nodes of the first narrative. In some variations, a second narrative may be displayed using the chatbot interface based on the first narrative. For example, a user may select a displayed tag (e.g., "Other story" in FIG. 7) associated with the first narrative.

In some variations, a playlist and narrative editor may be displayed (1414). For example, a user may select a "new playlist" icon where one or more songs and narratives may be added, modified, and saved. The editor may comprise drag-and-drop functionality. Furthermore, one or more playlists may be shared privately or publically with one or more users.

In some variations, a chatroom may be generated and displayed for users playing the song and/or narrative (1416). For example, a plurality of users simultaneously playing the same song and/or narrative may select a chat icon to join a real-time chatroom.

II. System

Overview

Also described here are systems that may include one or more of the components used to contextualize media. Generally, described herein is an artificial intelligence (AI) environment configured to provide and contextualize media. In some variations, the AI environment may include a graph database, natural language processor, narrative generator, voice synthesizer, conversation simulator, and media player. One or more users may interact with a user interface on a user computing device (e.g., mobile device such as a mobile phone or tablet, or other suitable computing device such as a laptop or desktop computer, etc.) that is in communication with the AI environment. In some aspects of the methods and systems described herein, a user may engage in chat conversations within an AI environment, such as with an AI disc jockey (e.g., represented by a chatbot or other conversation simulator associated with an NLP model) and/or one or more other users. The AI disc jockey may provide media and narrative to one or more users in response to user inputs (e.g., queries) within a chat conversation. User input may, for example, request a narrative associated with media. For example, an NLP model may be configured to process user input as queries to generate a narrative from a set of second graph data nodes, as described herein. In some variations, playlists, narratives, and/or media may be shared among users and/or the AI disc jockey. In some variations, the method may further include processing user input using an NLP model for storage in a graph database.

The AI environment may be accessible from a plurality of configurations. For example, in some variations, the AI disc jockey may include a conversation simulator accessible on a mobile chat platform (e.g., accessible through a mobile application executable on a mobile computing device such as a smartphone) as well as a custom web-based platform (e.g., accessible through a web browser on a laptop or desktop computing device). In these variations, a user may interact with the mobile and web-based platforms interchangeably to access media and narrative content. As another example, the AI disc jockey may be integrated within pre-existing websites and/or mobile applications, and accessible by selection of an icon (e.g., button) displayed within the website or mobile application user interface, or in any other suitable manner. Furthermore, the AI environment may include a system of applications that allows services (e.g., music streaming, media streaming) to integrate media and narrative content in real-time for users.

Figure 15:
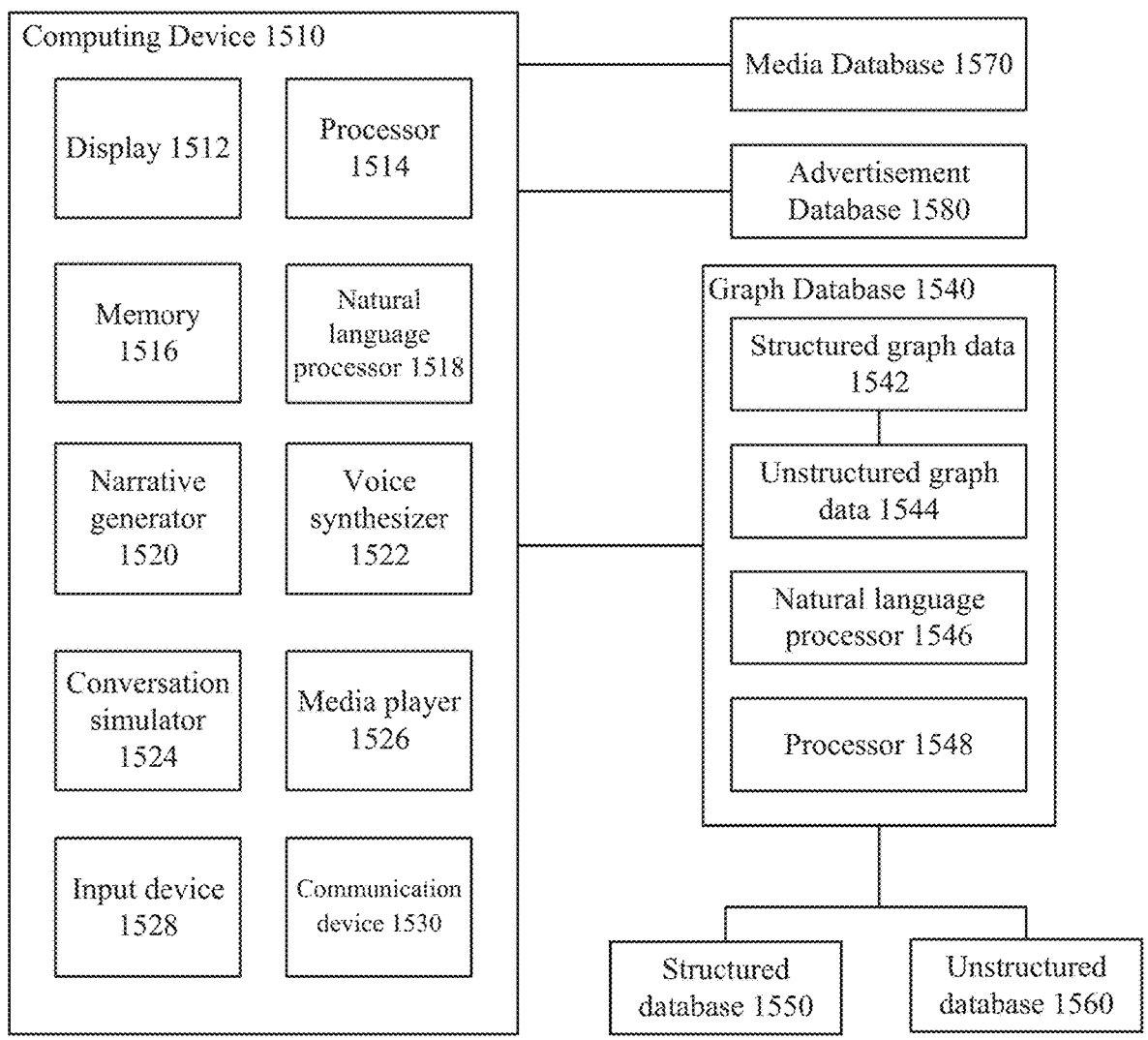
FIG. 15 is a block diagram of an illustrative variation of a computing device.

FIG. 15 is a block diagram of a media contextualization system (1500) comprising a computing device (1510), graph database (1540), one or more structured databases (1550), one or more unstructured databases (1560), one or more media databases (1570), and one or more advertisement databases (1580). In some variations, the computing device (1510) may comprise one or more of a display (1512), processor (1514), memory (1516), natural language processor (1518), narrative generator (1520), voice synthesizer (1522), conversation simulator (1524), media player (1526), input device (1528), and communication device (1530).

Display

Image data may be output on a display (e.g., display (1512)) of a media contextualization system. In some variations, a display may include at least one of a light emitting diode (LED), liquid crystal display (LCD), electroluminescent display (ELD), plasma display panel (PDP), thin film transistor (TFT), organic light emitting diodes (OLED), electronic paper/e-ink display, laser display, and/or holographic display.

Processor

The processor (e.g., processor (1514)) described here may process data and/or other signals to control one or more components of the system (e.g., computing device, graph database). The processor may be configured to receive, process, compile, compute, store, access, read, write, and/or transmit data and/or other signals. Additionally, or alternatively, the processor may be configured to control one or more components of a device and/or one or more components of computing device (e.g., laptop, tablet, personal computer).

In some variations, the processor may be configured to access or receive data and/or other signals from one or more of an graph database, computing device, and a storage medium (e.g., memory, flash drive, memory card). In some variations, the processor may be any suitable processing device configured to run and/or execute a set of instructions or code and may include one or more data processors, image processors, graphics processing units (GPU), physics processing units, digital signal processors (DSP), analog signal processors, mixed-signal processors, machine learning processors, deep learning processors, finite state machines (FSM), compression processors (e.g., data compression to reduce data rate and/or memory requirements), encryption processors (e.g., for secure wireless data transfer), and/or central processing units (CPU). The processor may be, for example, a general purpose processor, Field Programmable Gate Array (FPGA), an Application Specific Integrated Circuit (ASIC), a processor board, and/or the like. The processor may be configured to run and/or execute application processes and/or other modules, processes and/or functions associated with the system. The underlying device technologies may be provided in a variety of component types (e.g., metal-oxide semiconductor field-effect transistor (MOSFET) technologies like complementary metal-oxide semiconductor (CMOS), bipolar technologies like emitter-coupled logic (ECL), polymer technologies (e.g., silicon-conjugated polymer and metal-conjugated polymer-metal structures), mixed analog and digital, and the like.

The systems, devices, and/or methods described herein may be performed by software (executed on hardware), hardware, or a combination thereof. Hardware modules may include, for example, a general-purpose processor (or microprocessor or microcontroller), a field programmable gate array (FPGA), and/or an application specific integrated circuit (ASIC). Software modules (executed on hardware) may be expressed in a variety of software languages (e.g., computer code), including C, C++, Java®, Python, Ruby, Visual Basic®, and/or other object-oriented, procedural, or other programming language and development tools. Examples of computer code include, but are not limited to, micro-code or micro-instructions, machine instructions, such as produced by a compiler, code used to produce a web service, and files containing higher-level instructions that are executed by a computer using an interpreter. Additional examples of computer code include, but are not limited to, control signals, encrypted code, and compressed code.

Memory

The media contextualization systems and devices described here may include a memory (e.g., memory (1516)) configured to store data and/or information. In some variations, the memory may include one or more of a random access memory (RAM), static RAM (SRAM), dynamic RAM (DRAM), a memory buffer, an erasable programmable read-only memory (EPROM), an electrically erasable read-only memory (EEPROM), a read-only memory (ROM), flash memory, volatile memory, non-volatile memory, combinations thereof, and the like. In some variations, the memory may store instructions to cause the processor to execute modules, processes, and/or functions associated with the device, such as image processing, image display, data and/or signal transmission, data and/or signal reception, and/or communication. Some variations described herein may relate to a computer storage product with a non-transitory computer-readable medium (also may be referred to as a non-transitory processor-readable medium) having instructions or computer code thereon for performing various computer-implemented operations. The computer-readable medium (or processor-readable medium) is non-transitory in the sense that it does not include transitory propagating signals per se (e.g., a propagating electromagnetic wave carrying information on a transmission medium such as space or a cable). The media and computer code (also may be referred to as code or algorithm) may be those designed and constructed for the specific purpose or purposes.

In some variations, the memory may be configured to store any received data and/or data generated by the device. In some variations, the device may be configured to store graph data (e.g., second graph data nodes, user graph data, user activity, user preferences, and user input. In some variations, the memory may be configured to store data temporarily or permanently.

Virtual Host

In some variations, a virtual host (e.g., AI environment, AI disc jockey) may comprise one or more of a natural language processor (1518), narrative generator (1520), voice synthesizer (1522), conversation simulator (1524), and media player (1526). The virtual host may be configured to control media playback, receive graph data from a graph database and media from a media database, generate and provide a narrative associated with the media, converse with a user, facilitate a chatroom, and control one or more applications of a computing device.

A natural language processor (e.g., natural language processor (1518)) may process user input and/or other signals to parse user input (e.g., queries or other statements) and predict a user intent. In some variations, a natural language processor may comprise a syntax analyzer configured to parse the user input and a semantic analyzer configured to predict user intent. The natural language processor may be configured to process data using one or more natural language processing models. In some variations, the natural language processor and/or the conversation simulator may be stored on one or multiple memory devices, in any suitable architecture (e.g., distributed, local, etc.). A narrative generator (e.g., narrative generator (1520)) may generate a narrative associated with a song based on one or more media and user parameters. In some variations, the narrative generator may generate a narrative from received unstructured graph data nodes (1544) of a graph database (1540). A voice synthesizer (e.g., voice synthesizer (1522)) may convert text to voiced speech. In some variations, a voice synthesizer may comprise a voice cloner configured to receive a human voice sample and generate a cloned voice. The virtual host may comprise the voice characteristics of the cloned voice.

The voice synthesizer may be coupled to an output device (e.g., audio device) configured to output the voiced speech. In some variations, the voice synthesizer may be configured to receive input from one or more of the narrative generator (1520) and the conversation simulator (1524). A conversation simulator (e.g., conversation simulator (1524)) may be configured to converse with a user and provide media and narrative functionality. In some variations, the conversation simulator may process user input using the natural language processor (1518), receive a narrative from a narrative generator (1520), and output text to the voice synthesizer (1522). A media player (e.g., media player (1526)) may be configured to output media (e.g., play music, video). In some variations, the media player may comprise a user interface configured to control media output.

Input Device

In some variations, the display may include and/or be operatively coupled to an input device (1528) (e.g., touch screen) configured to receive input data from a user. For example, user input to an input device (1528) (e.g., keyboard, buttons, touch screen) may be received and processed by a processor (e.g., processor (1514)) and memory (e.g., memory (1516)) of the visualization system. The input device may include at least one switch configured to generate a user input. For example, an input device may include a touch surface for a user to provide input (e.g., finger contact to the touch surface) corresponding to a user input. An input device including a touch surface may be configured to detect contact and movement on the touch surface using any of a plurality of touch sensitivity technologies including capacitive, resistive, infrared, optical imaging, dispersive signal, acoustic pulse recognition, and surface acoustic wave technologies. In variations of an input device including at least one switch, a switch may have, for example, at least one of a button (e.g., hard key, soft key), touch surface, keyboard, analog stick (e.g., joystick), directional pad, mouse, trackball, jog dial, step switch, rocker switch, pointer device (e.g., stylus), motion sensor, image sensor, and microphone. A motion sensor may receive user movement data from an optical sensor and classify a user gesture as a user input. A microphone may receive audio data and recognize a user voice as a user input.

In some variations, the media contextualization system may optionally include one more output devices in addition to the display, such as, for example, an audio device and haptic device. An audio device may audibly output any system data, alarms, and/or notifications. For example, the audio device may output an audible alarm when a malfunction is detected. In some variations, an audio device may include at least one of a speaker, piezoelectric audio device, magnetostrictive speaker, and/or digital speaker. In some variations, a user may communicate with other users using the audio device and a communication channel. For example, a user may form an audio communication channel (e.g., VoIP call).

Additionally or alternatively, the system may include a haptic device configured to provide additional sensory output (e.g., force feedback) to the user. For example, a haptic device may generate a tactile response (e.g., vibration) to confirm user input to an input device (1528) (e.g., touch surface). As another example, haptic feedback may notify that user input is overridden by the processor.

Communication Device

In some variations, the computing device may include a communication device (e.g., communication device (1530)) configured to communicate with another computing device and one or more databases. The communication device may be configured to connect the computing device to another system (e.g., Internet, remote server, graph database, media database) by wired or wireless connection. In some variations, the system may be in communication with other devices via one or more wired and/or wireless networks. In some variations, the communication device may include a radiofrequency receiver, transmitter, and/or optical (e.g., infrared) receiver and transmitter configured to communicate with one or more devices and/or networks. The communication device may communicate by wires and/or wirelessly.

The communication device may include RF circuitry configured to receive and send RF signals. The RF circuitry may convert electrical signals to/from electromagnetic signals and communicate with communications networks and other communications devices via the electromagnetic signals. The RF circuitry may include well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth.

Wireless communication through any of the devices may use any of plurality of communication standards, protocols and technologies, including but not limited to, Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Wireless Fidelity (WiFi) (e.g., IEEE 802.11a, IEEE 802.11b, IEEE 802.11g, IEEE 802.11n, and the like), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol. In some variations, the devices herein may directly communicate with each other without transmitting data through a network (e.g., through NFC, Bluetooth, WiFi, RFID, and the like).

In some variations, the systems, devices, and methods described herein may be in communication with other wireless devices via, for example, one or more networks, each of which may be any type of network (e.g., wired network, wireless network). The communication may or may not be encrypted. A wireless network may refer to any type of digital network that is not connected by cables of any kind. Examples of wireless communication in a wireless network include, but are not limited to cellular, radio, satellite, and microwave communication. However, a wireless network may connect to a wired network in order to interface with the Internet, other carrier voice and data networks, business networks, and personal networks. A wired network is typically carried over copper twisted pair, coaxial cable and/or fiber optic cables. There are many different types of wired networks including wide area networks (WAN), metropolitan area networks (MAN), local area networks (LAN), Internet area networks (IAN), campus area networks (CAN), global area networks (GAN), like the Internet, and virtual private networks (VPN). Hereinafter, network refers to any combination of wireless, wired, public and private data networks that are typically interconnected through the Internet, to provide a unified networking and information access system.

Cellular communication may encompass technologies such as GSM, PCS, CDMA or GPRS, W-CDMA, EDGE or CDMA2000, LTE, WiMAX, and 5G networking standards. Some wireless network deployments combine networks from multiple cellular networks or use a mix of cellular, Wi-Fi, and satellite communication.

Graph Database

In some variations, a graph database (1540) may be configured to provide graph data to one or more of a computing device (1510), media database (1570), and advertisement database (1580). In some variations, a graph database may comprise one or more of structured graph data (1542), unstructured graph data (1544), natural language processor (1546), and processor (1548). Structured graph data (1542) may comprise graph data nodes of structured data from a structured database (1550). Unstructured graph data (1544) may comprise graph data nodes of unstructured data from an unstructured database (1560). The graph database (1540) may comprise a plurality of databases.

Structured Database

The graph data may comprise a plurality of structured and unstructured data gathered from a plurality of sources. Graph data refers to a data structure comprising a plurality of graph data nodes (e.g., vertices, points) connected by respective links (e.g., edges, lines). In some variations, a graph data node may comprise an entity and a link may comprise at least a relationship between entities. Graph data nodes may be characterized not only be relationships, but also by other properties (e.g., tags, attributes, metadata).

Structured data may comprise data organized in a predetermined data model. In some variations, the predetermined data model may comprise a predetermined audio data model. For example, a predetermined audio data model may comprise the MusicBrainz XML Metadata Format (MMD) representation of music metadata. The structured data under the predetermined audio model may be retrieved from a structured relational database in a set of tables having predetermined data fields.

Unstructured Database

In some variations, an unstructured database (1560) may be configured to provide unstructured data to one or more of a computing device (1510) and graph database (1540). The media database (1570) may comprise a plurality of databases. Unstructured data may comprise data not organized according to a predetermined data model. For example, some unstructured data may be associated with the audio, but may not comply with a predetermined audio data model.

In some variations, unstructured data associated with media (e.g., audio, video) may be received from one or more unstructured databases (1560). In some variations, one or more unstructured databases may comprise one or more of audio data, video data, text data, social media data, social networking data, and messaging data. For example, an unstructured database may comprise one or more of an open collaboration encyclopedia (e.g., wiki), digital library (e.g., Library of Congress), media popularity database (e.g., weekly sales and streams charts, box office chart, ratings chart), ticket sales and distribution database, media streaming database (e.g., music streaming service), social news aggregation website, discussion website, web content rating website, microblogging website, social media website, social network website, video-sharing site, streaming website, academic website, online forum, message board, lyrics site, artist website, fan website, news database (e.g., news website, news channel), weather database, traffic database, government database, business database, sports database, entertainment database, politics database, events database, web archive website, combinations thereof, and any scrapable database.

Media Database

In some variations, a media database (1570) may be configured to provide media to one or more of a computing device (1510) and graph database (1540). The media database (1570) may comprise a plurality of databases. Media may refer generally to a form of communication (e.g., mode of expression) including, but not limited to, audio (e.g., music, radio, podcast, spoken word, audio book), video (e.g., movie, TV, image, art, virtual reality, video game, virtual world), text (e.g., publication, book, print, website), social media and networking (e.g., chat, live streaming, online community, forum, message board, text sharing, image sharing, video sharing), messaging (e.g., email, text), and performance (e.g., show, dance, theater, concert).

The specific examples and descriptions herein are exemplary in nature and variations may be developed by those skilled in the art based on the material taught herein without departing from the scope of the present invention, which is limited only by the attached claims.

The invention claimed is:

1. A method of organizing audio, comprising:
generating first graph data nodes from structured text data comprising a predetermined audio data model;
processing unstructured data using a natural language processing (NLP) model to generate second graph data nodes, wherein the first and second graph data nodes are associated with the audio; and
linking the one or more first graph data nodes to the one or more corresponding second graph data nodes using the NLP model.

2. The method of claim 1, further comprising:
processing the second graph data nodes using the NLP model to determine one or more relationships between the first and second graph data nodes, wherein linking is based on the one or more relationships.

3. The method of claim 2, further comprising:
processing the second graph data nodes using the NLP model to generate a plurality of keywords;
associating the plurality of keywords with a respective word vector; and
calculating a similarity between the second graph data nodes based on a similarity between each of the word vectors.

4. The method of claim 1, wherein the unstructured data comprises image data.

5. The method of claim 1, further comprising:
computing similarity between the second graph data nodes;
linking the second graph data nodes based on the similarity; and
generating a narrative associated with the audio based at least on the similarity.

6. A method of providing an audio program, comprising:
playing one or more songs of the audio program;
providing a narrative comprising one or more sentences of unstructured data associated with one or more of the songs of the audio program in response to the one or more songs being played;
sequentially accompanying one or more of the songs being played with the narrative spoken by a virtual host, wherein providing the narrative is based at least on user activity and preferences;
receiving the user activity using a conversation simulator on a computing device; and
outputting one or more of the narrative using a natural language generation model and a suggested song using the conversation simulator in response to the user activity.

7. The method of claim 6, wherein the virtual host comprises a set of configurable voice characteristics.

8. The method of claim 6, wherein the virtual host comprises a plurality of voices.

9. The method of claim 6, wherein the narrative comprises one or more of a response to user activity, music, news, traffic, weather, events, and advertisements.

10. The method of claim 6, wherein the user activity comprises one or more of time and user geolocation.

11. The method of claim 6, wherein the narrative comprises an image displayed on a user interface.

12. The method of claim 6, wherein the conversation simulator comprises a natural language processing model and the natural language generation model.

13. The method of claim 6, further comprising providing a chatroom comprising a plurality of users simultaneously playing one or more of the songs and the narrative.

14. The method of claim 6, further comprising providing a graphical user interface for independent playback selection of one or more of the songs and the narrative comprising unstructured data to a playlist.

15. The method of claim 6, further comprising generating a shared playlist for a plurality of users, the shared playlist comprising the narrative and the song.

16. The method of claim 15, wherein the shared playlist is based on one or more of physical proximity of at least two users and online activity.

17. The method of claim 6, further comprising:
generating the narrative from graph data; and
updating the graph data based on crowd-sourced input.

18. A method of displaying a graphical user interface for a virtual radio, comprising:
displaying a graphical representation of a media player and search interface on a display;
processing user input to the search interface; and
displaying a narrative associated with a song being played by the media player in response to the user input, the narrative comprising one or more sentences generated from unstructured graph data.

19. The method of claim 18, further comprising displaying a graphical representation of a chatroom for a plurality of users simultaneously playing the song.

20. The method of claim 18, further comprising displaying a graphical representation of a playlist editor for independent playback selection of the song and the narrative in a playlist.

21. The method of claim 18, wherein the narrative comprises a first narrative, and the method further comprises displaying a graphical representation of a second narrative related to the first narrative.

22. The method of claim 18, further comprising displaying a graphical representation of a suggested song based on the narrative.

23. A method of providing an audio program, comprising:
playing one or more songs of the audio program;
providing a narrative comprising one or more sentences of unstructured data associated with one or more of the songs of the audio program in response to the one or more songs being played;
sequentially accompanying one or more of the songs being played with the narrative spoken by a virtual host
generating graph data associated with the one or more songs based on the user activity of a plurality of users in response to playing the audio program and the narrative in a chatroom; and
processing the graph data using a natural language processing model.

24. The method of claim 23, wherein the virtual host comprises a set of configurable voice characteristics.

25. The method of claim 23, wherein the virtual host comprises a plurality of voices.

26. The method of claim 23, wherein the narrative comprises one or more of a response to user activity, music, news, traffic, weather, events, and advertisements.

27. The method of claim 23, wherein the user activity comprises one or more of time and user geolocation.

28. The method of claim 23 wherein the narrative comprises an image displayed on a user interface.

29. The method of claim 23, wherein the conversation simulator comprises a natural language processing model and the natural language generation model.

30. The method of claim 23, further comprising providing a chatroom comprising a plurality of users simultaneously playing one or more of the songs and the narrative.

\* \* \* \* \*